US012794839B2

(12) United States Patent
Cheng et al.

(10) Patent No.: US 12,794,839 B2
(45) Date of Patent: Nov. 10, 2026

(54) IMAGE TRANSMISSION

(71) Applicant: Tencent Technology (Shenzhen) Company Limited, Shenzhen (CN)

(72) Inventors: Fei Cheng, Shenzhen (CN); Kai Kang, Shenzhen (CN); Yunlong Zhu, Shenzhen (CN); Wenhao Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 153 days.

(21) Appl. No.: 18/586,093

(22) Filed: Feb. 23, 2024

(65) Prior Publication Data

US 2024/0195770 A1 Jun. 13, 2024

Related U.S. Application Data

(63) Continuation of application No. PCT/CN2023/089288, filed on Apr. 19, 2023.

(30) Foreign Application Priority Data

Aug. 16, 2022 (CN) ......................... 202210983027.1

(51) Int. Cl.

| | |
|---|---|
| ***H04L 51/10*** | (2022.01) |
| ***G06F 3/0482*** | (2013.01) |
| ***G06T 15/00*** | (2011.01) |
| ***H04L 51/04*** | (2022.01) |

(52) U.S. Cl.

CPC ............ *H04L 51/10* (2013.01); *G06F 3/0482* (2013.01); *G06T 15/00* (2013.01); *H04L 51/04* (2013.01)

(58) Field of Classification Search

None

See application file for complete search history.

(56) References Cited

U.S. PATENT DOCUMENTS

| | | | | |
|---|---|---|---|---|
| 2013/0278607 A1* | 10/2013 | Twigg | G06T 13/80 345/473 |
| 2022/0398787 A1* | 12/2022 | Sharma | G06T 11/00 |

FOREIGN PATENT DOCUMENTS

| | | | |
|---|---|---|---|
| CN | 111049735 A * | 4/2020 | H04L 51/52 |
| CN | 114880062 A * | 8/2022 | G06T 11/60 |

OTHER PUBLICATIONS

How do I reverse a photo or mirror it? (Year: 2022).*

How can I create "friendmoji's"—dual Bitmoji images with 2 people in the same image? (Year: 2017).*

(Continued)

*Primary Examiner* — Tonia L Dollinger

*Assistant Examiner* — Ishrat Rashid

(74) *Attorney, Agent, or Firm* — ARENTFOX SCHIFF LLP

(57) ABSTRACT

In an image transmission method, a first image is displayed in a messaging interface. The first image includes an interaction effect between a plurality of virtual objects. A request is received from a current user to transmit a second image that is based on the first image. A target user to which the second image is to be transmitted is determined. The second image that is generated according to object information of the determined target user and the first image is displayed in the messaging interface. The second image and the first image include the same interaction effect.

20 Claims, 30 Drawing Sheets

(56) References Cited

OTHER PUBLICATIONS

"Where to open QQ Show", Kafan.com, https://www.kafan.cn/edu/64212954.html, Jun. 19, 2016, pp. 1-7 (Original Document only).

Office Action received for Chinese Patent Application No. 202210983027.1, mailed on May 28, 2026, 23 pages (8 pages of English Translation and 15 pages of Original Document).

* cited by examiner

IMAGE TRANSMISSION

RELATED APPLICATIONS

The present application is a continuation of International Application No. PCT/CN2023/089288, filed on Apr. 19, 2023, which claims priority to Chinese Patent Application No. 202210983027.1, filed on Aug. 16, 2022 and entitled "INTERACTIVE EMOTICON TRANSMITTING METHOD AND APPARATUS, COMPUTER MEDIUM, AND ELECTRONIC DEVICE." The entire disclosures of the prior applications are hereby incorporated by reference in their entirety.

FIELD OF THE TECHNOLOGY

This application pertains to the field of messaging technologies, including to an image transmission method and apparatus, a computer medium, and an electronic device.

BACKGROUND OF THE DISCLOSURE

With the popularization of social instant messaging software, more and more users choose to communicate by using social instant messaging software. When using social instant messaging software, emoticons may be used for communication in addition to text and voice. "Emoticon" is a manner of expressing feelings by using pictures, and is a popular culture formed after social software is active.

Currently, when a user is interested in an interactive emoticon transmitted by a chat object or an interactive emoticon in an emoticon library, and wants to transmit a same type of interactive emoticon, the user needs to forward the interactive emoticon, or needs to store the interactive emoticon before selecting it from an emoticon panel to transmit the interactive emoticon. However, when being directly forwarded, the interactive emoticon is displayed as it is. The interactive emoticon remains the same regardless of a different sender or interaction object, lacking fun. In addition, when the interactive emoticon is stored before being selected from the emoticon panel to transmit the interactive emoticon, there is a problem of cumbersome steps and low transmitting efficiency.

SUMMARY

This disclosure includes an image transmission method and apparatus, a non-transitory computer-readable storage medium, and an electronic device. Aspects of the present disclosure may be used to address a problem that image transmission steps, such as interactive emoticon transmitting steps, in the related art may be cumbersome, inefficient, and lacking fun.

According to an aspect of embodiments of this disclosure, an image transmission method is provided. The image transmission method is performed by a first terminal, for example. In the image transmission method, a first image is displayed in a messaging interface. The first image includes an interaction effect between a plurality of virtual objects. A request is received from a current user to transmit a second image that is based on the first image. A target user to which the second image is to be transmitted is determined. The second image that is generated according to object information of the determined target user and the first image is displayed in the messaging interface. The second image and the first image include the same interaction effect.

According to an aspect of the embodiments of this disclosure, an information processing apparatus is provided. The information processing apparatus includes processing circuitry that is configured to display a first image in a messaging interface. The first image includes an interaction effect between a plurality of virtual objects. The processing circuitry is configured to receive a request from a current user to transmit a second image that is based on the first image. The processing circuitry is configured to determine a target user to which the second image is to be transmitted. The processing circuitry is configured to display the second image that is generated according to object information of the determined target user and the first image in the messaging interface, the second image and the first image including the same interaction effect.

According to an aspect of the embodiments of this disclosure, a non-transitory computer-readable storage medium is provided, and instructions stored thereon. When being executed by a processor, the processor implements the image transmission method.

According to an aspect of the embodiments of this disclosure, an electronic device is provided, and the electronic device includes a processor; and a memory, configured to store executable instructions of the processor. The processor is configured to perform, by executing the executable instructions, the image transmission method.

According to an aspect, in an interactive emoticon transmitting method, selection of a target interaction object is triggered in response to a trigger operation on a first interactive emoticon displayed in a chat interface. After the target interaction object is selected, a second interactive emoticon may be generated according to the first interactive emoticon and object information of the target interaction object, where the first interactive emoticon includes an interaction effect between at least two virtual objects, and the generated second interactive emoticon has the same interaction effect as the first interactive emoticon. In the interactive emoticon transmitting method in this disclosure, different trigger operations can be performed on the first interactive emoticon, and target interaction objects can be selected in different forms, so that virtual images and identifier information in the interactive emoticon are replaced based on different target interaction objects on the basis of remaining the interaction effect of the interactive emoticon, so that the interactive emoticon can have different display effects, versatility of the interactive emoticon and interest of transmitting the interactive emoticon are improved, and efficiency and convenience of transmitting the interactive emoticon can be improved, thereby improving user experience.

DESCRIPTION OF EMBODIMENTS

An embodiment of this disclosure provides an image transmission method, such as an interactive emoticon transmitting method. Before the image transmission method is described in detail, an exemplary system architecture used in the technical solution of this disclosure is first described.

Figure 1:
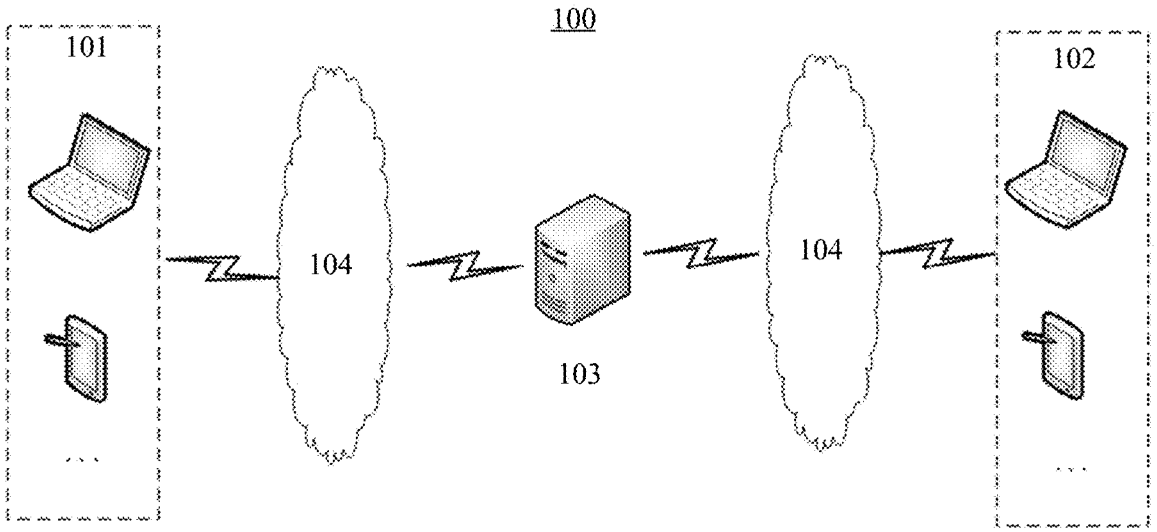
FIG. 1 schematically shows an architectural block diagram of a system to which the technical solutions of this disclosure are applied.

FIG. 1 is a schematic block diagram of an exemplary system architecture to which a technical solution of this disclosure is applied.

As shown in FIG. 1, a system architecture 100 may include a first terminal 101, a second terminal 102, a server 103, and a network 104. Both the first terminal 101 and the second terminal 102 may include various electronic devices that have a display screen, such as a smartphone, a tablet computer, a notebook computer, a desktop computer, an intelligent television, and an intelligent in-vehicle terminal. The first terminal 101 may be a terminal device used by a current user, the second terminal 102 may be a terminal device used by another user who is a chat object of the current user in social instant messaging software, and the current user and the chat object user may communicate with each other in a chat interface of the social instant messaging software by using the first terminal 101 and the second terminal 102. The communication includes communication in a form of text, voice, emoticon, and the like. The server 103 may be an independent physical server, may be a server cluster or a distributed system formed by multiple physical servers, or may be a cloud server that provides a cloud computing service. The network 104 may be a communication medium of various connection types that can provide a communication link between the first terminal 101 and the server 103 and between the second terminal 102 and the server 103, for example, may be a wired communication link or a wireless communication link.

According to an implementation requirement, the system architecture in this embodiment of this disclosure may have any quantity of first terminals, second terminals, networks, and servers. For example, the server may be a server group that includes multiple server devices. In addition, the technical solution provided in this embodiment of this disclosure may be applied to the server 103, or may be applied to the first terminal 101 or the second terminal 102. This is not specifically limited in this disclosure.

In an embodiment of this disclosure, the current user logs in to the social instant messaging software in the first terminal 101, and the chat object of the current user logs in to the social instant messaging software in the second terminal 102. The current user and the chat object enter a chat room and communicate by transmitting information such as a text, voice, a video, and an emoticon. In a chat process, when the current user sees that the chat object transmits an interesting first interactive emoticon, or sees an interesting first interactive emoticon in an emoticon panel, and also wants to transmit a same type of interactive emoticon, the current user may perform a trigger operation on the first interactive emoticon to trigger selection of a target interaction object. After the current user selects the target interaction object, the first terminal 101 may generate a second interactive emoticon according to the first interactive emoticon and object information of the target interaction object, and display the second interactive emoticon in a chat interface, where the second interactive emoticon and the first interactive emoticon have the same interaction effect.

The first interactive emoticon may be an interactive emoticon displayed in a session region of the chat interface, or may be an interactive emoticon displayed in an emoticon display region of the chat interface. For first interactive emoticons located in different display regions, trigger operations on the first interactive emoticons are different. When the first interactive emoticon is located in the session region, three trigger manners may be included. The first manner is to perform a trigger operation a same-type emoticon transmitting control corresponding to the first interactive emoticon, the second manner is to perform a press operation on the first interactive emoticon, and the third manner is to perform a drag operation on the first interactive emoticon. When the first interactive emoticon is located in the emoticon display region, there may be two trigger forms: One is to perform a press operation on the first interactive emoticon, and the other is to perform a drag operation on the first interactive emoticon.

After a trigger operation is performed on the same-type emoticon transmitting control corresponding to the first interactive emoticon or a press operation is performed on the first interactive emoticon, the first terminal 101 may display an interaction object selection list in the chat interface, trigger selection of the target interaction object in response to a trigger operation on the target interaction object in the interaction object selection list or a selection control corresponding to the target interaction object by the current user, obtain object information of the target interaction object, and generate a second interactive emoticon according to the object information. The object information may include a virtual image and identifier information of the target interaction object. For example, when the second interactive emoticon is generated, only a virtual image and identifier information of a virtual object in the first interactive emoticon need to be replaced with the virtual image and the identifier information of the target interaction object.

When a drag operation is performed on the first interactive emoticon, the first interactive emoticon may be dragged to a virtual object display region, or the first interactive emoticon may be dragged to an input box.

When the first interactive emoticon is dragged to the virtual object display region, a to-be-selected virtual object that overlaps the first interactive emoticon and that is in the virtual object display region may be used as the target interaction object. When the first interactive emoticon overlaps the to-be-selected virtual object, a display attribute of a virtual image and/or identifier information of the to-be-selected virtual object may be changed, for example, a change of a color, a size, a background, or the like. After the target interaction object is determined, the first terminal 101 may obtain object information of the target interaction object, and generate a second interactive emoticon according to the object information, where the object information includes a virtual image and identifier information of the target interaction object.

When the first interactive emoticon is dragged to the input box, the first terminal 101 may display, in the input box, text information corresponding to the first interactive emoticon, in response to a trigger operation on a first interaction object identifier control, display, in the input box, an identifier corresponding to the interaction object identifier control, and after the target interaction object is selected, display, in the input box, the identifier information corresponding to the target interaction object. The first interaction object identifier control is an interaction object identifier control corresponding to the target interaction object. The interaction object identifier control may be a functional control disposed in an information input unit, a functional control disposed in the chat interface, or a hidden functional control corresponding to a profile photo of an interaction object displayed in the chat interface, where the functional control in the information input unit may be specifically a key that is in a keyboard and corresponding to an identifier such as @, the functional control in the chat interface may be a function key that is disposed in the chat interface and that may call an interaction object selection list, and the hidden functional control corresponding to the profile photo of the interaction object displayed in the chat interface may be a profile photo of a chat object displayed in a session region.

When the interaction object identifier control is the functional control disposed in the information input unit or the functional control disposed in the chat interface, when a target interaction object is selected, the first terminal 101 may first respond to a trigger operation on the functional control, display an identifier corresponding to the functional control in an input box, and display an interaction object selection list in the chat interface; and respond to a trigger operation on a target interaction object in the interaction object selection list or a selection control corresponding to the target interaction object, so as to select the target interaction object, and display, in the input box, identifier information corresponding to the target interaction object.

When the interaction object identifier control is corresponding to the hidden functional control corresponding to the profile photo of the interaction object displayed in the chat interface, the first terminal 101 may display, in the input box, an identifier corresponding to the functional control and the identifier information corresponding to the target interaction object in response to a press operation on the functional control.

The user may also call the interaction object selection list by using some gestures, for example, make a gesture such as “L” in the input box. When detecting the gesture, the first terminal 101 may automatically call the interaction object selection list, and display the identifier information of the target interaction object in the input box in response to a trigger operation on the target interaction object in the interaction object selection list or a selection control corresponding to the target interaction object by the current user.

In an embodiment of this disclosure, the step of selecting the target interaction object from the input box and the step of dragging the first interactive emoticon to the input box are performed in any sequence.

In this embodiment of this disclosure, the server 103 may be a cloud server that provides a cloud computing service, that is, this disclosure relates to cloud storage and cloud computing technologies.

Cloud storage is a new concept extended and developed on a concept of cloud computing. A distributed cloud storage system (hereinafter referred to as a storage system) refers to a storage system that combines various storage devices (also referred to as storage nodes) in a network by using functions such as a cluster application, a grid technology, and a distributed storage file system, to work together by using application software or application interfaces to provide data storage and service access functions to the outside.

Currently, a storage method of the storage system is: creating a logical volume, and allocating physical storage space to each logical volume when creating the logical volume, where the physical storage space may be made up of a disk of a storage device or disks of several storage devices. A client stores data on a logical volume, that is, stores data on a file system. The file system divides the data into many parts, and each part is an object. The object includes not only data but also additional information such as a data identifier (ID). The file system writes each object into physical storage space of the logical volume, and the file system records storage position information of each object. Therefore, when the client requests to access the data, the file system can enable the client to access the data according to the storage position information of each object.

A process in which the storage system allocates physical storage space to the logical volume is specifically as follows: According to a capacity estimate of an object stored in a logical volume (the estimate often has a large margin relative to a capacity of an object actually to be stored) and a group of a redundant array of independent disk (RAID), physical storage space is pre-divided into stripes, and one logical volume may be understood as one stripe, so that the physical storage space is allocated to the logical volume.

Cloud computing is a computing mode in which computing tasks are distributed in a resource pool formed by a large quantity of computers, so that various application systems can obtain computing power, storage space, and information services as required. A network that provides resources is referred to as a "cloud". The resources in the "cloud" can be expanded indefinitely in a user's view, can be obtained at any time, used on demand, expanded at any time, and paid per use.

As a basic capability provider of cloud computing, a cloud computing resource pool (cloud platform for short) is established, which is generally referred to as an infrastructure as a service (IaaS) platform, and a plurality of types of virtual resources are deployed in the resource pool for external customers to choose from. The cloud computing resource pool mainly includes a computing device (a virtualized machine, including an operating system), a storage device, and a network device.

According to logical functions, a platform as a service (PaaS) layer may be deployed on the IaaS layer, and the software as a service (Saas) layer may be deployed on the PaaS layer, or the SaaS may be directly deployed on the IaaS layer. PaaS is a platform for software running, such as a database and a web container. SaaS is a variety of service software, such as a web portal or a short message group transmitter. Generally, SaaS and PaaS are upper layers relative to IaaS.

With reference to specific implementations, the following describes in detail technical solutions such as an interactive emoticon transmitting method, an interactive emoticon transmitting apparatus, a computer readable medium, and an electronic device provided in this disclosure.

Figure 2:
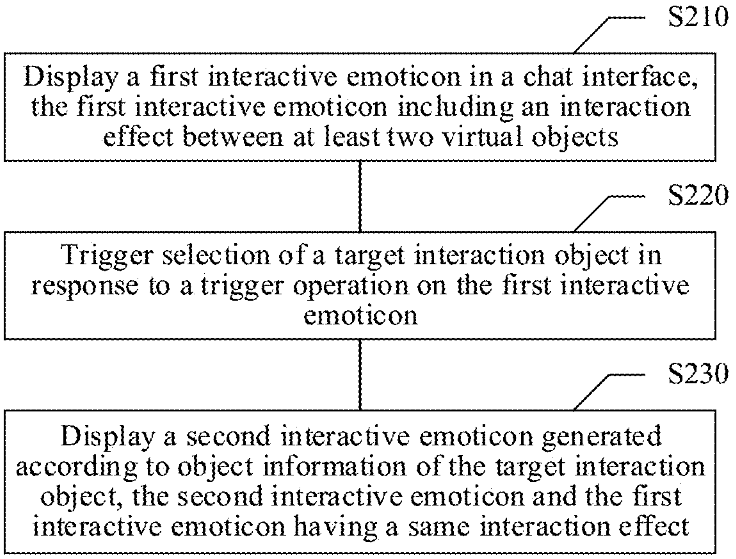
FIG. 2 is a schematic flowchart of steps of an interactive emoticon transmitting method according to an embodiment of this disclosure.

FIG. 2 is a schematic flowchart of steps of an interactive emoticon transmitting method according to an embodiment of this disclosure. The interactive emoticon transmitting method may be performed by a first terminal, and the first terminal may be specifically the first terminal 101 in FIG. 1. As shown in FIG. 2, the interactive emoticon transmitting method in this embodiment of this disclosure may include the following steps S210 to S230.

Step S210: Display a first interactive emoticon in a chat interface, the first interactive emoticon including an interaction effect between at least two virtual objects.

Step S220: Trigger selection of a target interaction object in response to a trigger operation on the first interactive emoticon.

Step S230: Display a second interactive emoticon generated according to object information of the target interaction object, the second interactive emoticon and the first interactive emoticon having a same interaction effect.

According to the interactive emoticon transmitting method provided in the embodiments of this disclosure, selection of a target interaction object is triggered in response to a trigger operation on a first interactive emoticon displayed in a chat interface. After the target interaction object is selected, a second interactive emoticon may be generated according to the first interactive emoticon and object information of the target interaction object, where the first interactive emoticon includes an interaction effect between at least two virtual objects, and the generated second interactive emoticon has the same interaction effect as the first interactive emoticon. In the interactive emoticon transmitting method in this disclosure, different trigger operations can be performed on the first interactive emoticon, and target interaction objects can be selected in different forms, so that virtual images and identifier information in the interactive emoticon are replaced based on different target interaction objects on the basis of remaining the interaction effect of the interactive emoticon, so that the interactive emoticon has different display effects, versatility of the interactive emoticon and interest of transmitting the interactive emoticon are improved, and efficiency and convenience of transmitting the interactive emoticon can be improved, thereby improving user experience. Specifically, a trigger operation is performed on the first interactive emoticon already displayed in the chat interface, that is, selection of the target interaction object and transmitting of the second interactive emoticon can be implemented. For example, a user chats with a buddy by using the chat interface. When a buddy transmits the first interactive emoticon in the chat interface, and the user wants to transmit a same type of emoticon, the user only needs to perform a trigger operation on the first interactive emoticon, that is, the user can trigger selection of a target buddy, and transmit the same type of emoticon to the target buddy. The user does not need to first store the first interactive emoticon, and then select and transmit the stored first interactive emoticon.

The following describes in detail a specific implementation of each method step of the interactive emoticon transmitting method in this embodiment of this disclosure.

In an aspect, a first image is displayed in a messaging interface. The first image includes an interaction effect between a plurality of virtual objects. In an example, in step S210, the first interactive emoticon is displayed in the chat interface, and the first interactive emoticon includes an interaction effect between at least two virtual objects.

In an embodiment of this disclosure, the first interactive emoticon may be an interactive emoticon transmitted by a chat object and displayed in a chat interface session region, or may be an interactive emoticon displayed in an emoticon display region of the chat interface. The emoticon display region may be expanded by triggering an emoticon list control disposed in the chat interface. For example, the emoticon list control may be a control disposed in a function region of the chat interface. Specifically, the emoticon list control may be disposed side by side with the input box, and may be disposed in another region of the chat interface. This is not specifically limited in this embodiment of this disclosure. An interactive emoticon in an interactive emoticon library is displayed in the emoticon display region. The current user can select a favorite interactive emoticon as a target interactive emoticon.

If the current user is interested in a first interactive emoticon transmitted by a chat object in the chat interface, or interested in a first interactive emoticon displayed in the emoticon display region, and wants to transmit a same type of interactive emoticon, the current user may perform a trigger operation on the first interactive emoticon, and after the target interaction object is selected, display, in the chat interface, a second interactive emoticon generated according to the first interactive emoticon and object information of the target interaction object.

In an embodiment of this disclosure, the first interactive emoticon includes an interaction effect between at least two objects, for example, a virtual object A and a virtual object B hold hands, and virtual objects A, B, and C jointly exercise. Correspondingly, after the target interaction object is selected, object information of a virtual object in the first interactive emoticon is replaced with the object information corresponding to the target interaction object. In this embodiment of this disclosure, the object information includes a virtual image and identifier information, where the virtual image and identifier information are differentiated information used for distinguishing the target interaction object from another chat object, and the identifier information is a unique identifier corresponding to the target interaction object, for example, a user name and a user ID that are registered by the target interaction object in social instant messaging software. During display, the identifier information may be displayed in an identifier display region above the virtual image, or may be displayed in an identifier display region below the virtual image, or may be displayed in an identifier display region around the virtual image or another position in the virtual image, which is not specifically limited in this embodiment of this disclosure.

In an aspect, a request is received from a current user to transmit a second image that is based on the first image. A target user to which the image is to be transmitted is determined. In an example, in step S220, selection of the target interaction object is triggered in response to a trigger operation on the first interactive emoticon.

In an embodiment of this disclosure, different trigger operations may be performed on first interactive emoticons displayed in different regions of the chat interface, so as to trigger selection of the target interaction object. In a case that the first interactive emoticon is an interactive emoticon displayed in the session region of the chat interface, the trigger operation may be specifically: a trigger operation on a same-emoticon transmitting control corresponding to the first interactive emoticon, a press operation on the first interactive emoticon, or a drag operation on the first interactive emoticon; and in a case that the first interactive emoticon is an interactive emoticon displayed in the emoticon display region of the chat interface, the trigger operation may be specifically: a press operation on the first interactive emoticon or a drag operation on the first interactive emoticon. After a trigger operation is performed on the first interactive emoticon, selection of the target interaction object may be triggered. For example, a trigger operation may be performed on the target interaction object in an interaction object selection list or a selection control corresponding to the target interaction object, so as to trigger selection of the target interaction object, or a trigger operation may be performed on a profile photo of an interaction object that exists in the chat interface, so as to trigger selection of the target interaction object.

In an embodiment of this disclosure, when the target interaction object is being selected, a quantity of target interaction objects may be determined according to a quantity of virtual objects included in the first interactive emoticon. In this embodiment of this disclosure, the quantity of target interaction objects is less than or equal to the quantity of virtual objects included in the first interactive emoticon. That is, the second interactive emoticon may replace object information of all virtual objects in the first interactive emoticon, or may replace object information of some virtual objects in the first interactive emoticon. Further, when the target interaction object is being selected, the current user may also select a virtual object of the current user. In this way, the generated second interactive emoticon may further display a virtual image and identifier information corresponding to the current user, so as to implement interaction between the current user and another selected target interaction object. In addition, when the quantity of target interaction objects is less than the quantity of virtual objects included in the first interactive emoticon, the system may automatically set to replace the virtual object in the first interactive emoticon with the target interaction object and the virtual object corresponding to the current user.

In an aspect, the second image that is generated according to object information of the determined target user and the first image is displayed in the messaging interface. The second image and the first image include the same interaction effect. In an example, in step S230, the second interactive emoticon generated according to the object information of the target interaction object is displayed, and the second interactive emoticon and the first interactive emoticon have the same interaction effect.

In an embodiment of this disclosure, after the target interaction object is selected, the second interactive emoticon may be generated according to the first interactive emoticon and the object information corresponding to the target interaction object. Corresponding to different trigger operation types of the first interactive emoticon, logic for generating the second interactive emoticon is different. Next, specific manners of generating the second interactive emoticon under different trigger operations in this embodiment of this disclosure are described in detail.

(I) The trigger operation on the first interactive emoticon is a trigger operation on a same-type emoticon transmitting control corresponding to the first interactive emoticon.

In an embodiment of this disclosure, when the trigger operation is a trigger operation on the same-type emoticon transmitting control corresponding to the first interactive emoticon, a specific procedure of implementing selection of the target interaction object is: displaying an interaction object selection list in the chat interface in response to the trigger operation on the same-type emoticon transmitting control; and then triggering selection of the target interaction object in response to a trigger operation on the target interaction object in the interaction object selection list or a selection control corresponding to the target interaction object.

In an embodiment of this disclosure, a method for performing a trigger operation on the same-type emoticon transmitting control corresponding to the first interactive emoticon to transmit a same type of interactive emoticon is applicable to a private chat scenario and a group chat scenario.

In a private chat scenario, only two persons: a current user and a chat object exist. Therefore, the target interaction object can only be the chat object. The current user may manually select the chat object as the target interaction object, or may not manually select the chat object. The system automatically selects the chat object as the target interaction object. When the first interactive emoticon is a two-person interactive emoticon, and the second interactive emoticon is generated in response to a trigger operation on the same-type emoticon transmitting control, only virtual objects that are corresponding to the current user and the chat object and that are in the first interactive emoticon need to be exchanged. When the first interactive emoticon is an interactive emoticon that includes more than two virtual objects, when the second interactive emoticon is generated in response to a trigger operation on the same-type emoticon transmitting control, only the virtual objects that are corresponding to the current user and the chat object and that are in the first interactive emoticon need to be exchanged, or virtual objects that are in the first interactive emoticon and that are different from those of the current user and the chat object may be replaced with target interaction objects, and the virtual object corresponding to the chat object is replaced with a virtual object that is different from those of the current user and the chat object, and the like. The virtual object that is different from those of the current user and the chat object may be a virtual object that is randomly set in the system.

Figure 3A:
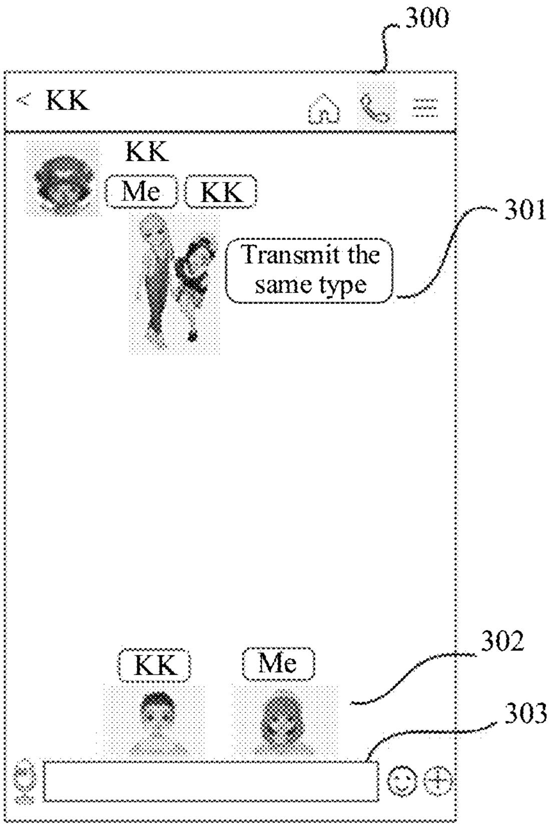
FIG. 3A and FIG. 3B are schematic diagrams of interfaces for transmitting a same type of interactive emoticon in a private chat scenario according to an embodiment of this disclosure.
Figure 3B:
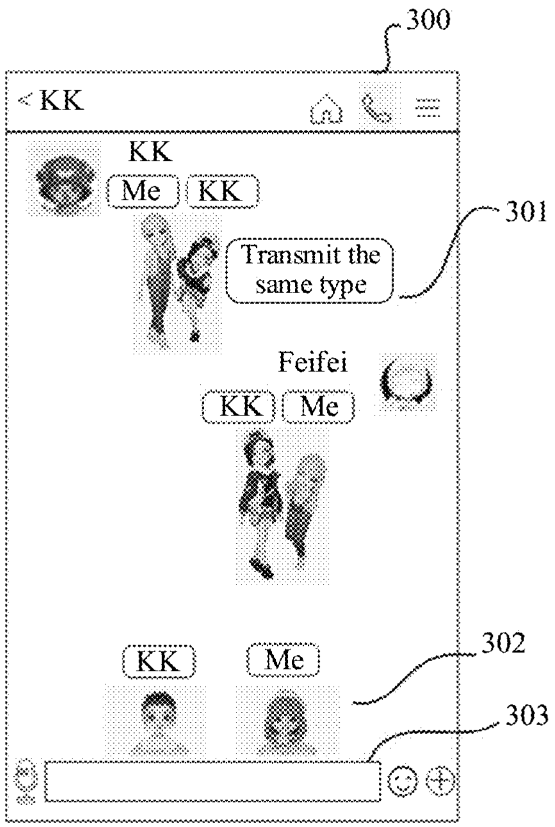

FIG. 3A and FIG. 3B are schematic diagrams of interfaces for transmitting a same type of interactive emoticon in a private chat scenario. As shown in FIG. 3A and FIG. 3B, a chat interface 300 includes a session region 301, a virtual object display region 302, and an input box region 303 from top to bottom, where information transmitted by a current user and a chat object, such as text information, voice information, an interactive emoticon, and other types of information is displayed in the session region 301, and the virtual object display region 302 includes a virtual image and identifier information of the current user and a virtual image and an object identifier of the chat object. As shown in FIG. 3A, a first interactive emoticon transmitted by the chat object is displayed in the session region 301. The first interactive emoticon is an emoticon in which virtual images of the chat object and the current user hold hands. The virtual image on the left side is corresponding to the current user, and the virtual image on the right side is corresponding to the chat object. Identifier information corresponding to each virtual image is displayed in an identifier display region above the virtual image, and a same-type emoticon transmitting control "Transmit the same type" is disposed on the right side of the first interactive emoticon. If the current user is interested in the first interactive emoticon, and wants to transmit a same type of interactive emoticon, the current user may trigger the same-type emoticon transmitting control "Transmit the same type". In response to the trigger operation, the session region 301 displays a second interactive emoticon generated according to the first interactive emoticon and object information of the chat object. As shown in FIG. 3B, the second interactive emoticon is a same type of interactive emoticon transmitted by the current user. In the second interactive emoticon, the left side is the virtual image and the identifier information of the chat object, and the right side is the virtual image and the identifier information of the current user. However, a display effect of the first interactive emoticon and a display effect of the second interactive emoticon are the same.

In a group chat scenario, the first interactive emoticon may be an interactive emoticon that includes two or more virtual objects. A quantity of target interaction objects may be less than or equal to a quantity of virtual objects. When the quantity of target interaction objects is less than the quantity of virtual objects, any virtual object that is in the first interactive emoticon and that is corresponding to the quantity of target interaction objects is replaced with a target interaction object. Further, a not-replaced virtual object may be replaced with the virtual object corresponding to the current user. When the quantity of target interaction objects is equal to the quantity of virtual objects, all virtual objects in the first interactive emoticon are replaced with target interaction objects. When the quantity of target interaction objects is less than the quantity of virtual objects in the first interactive emoticon, object information of a corresponding quantity of virtual objects in the first interactive emoticon may be replaced with object information of target interaction objects, and then object information of other virtual objects is retained or any virtual object in the other virtual objects is replaced with the virtual object of the current user. Further, a specific position in the first interactive emoticon may be further used as a display position of the virtual object corresponding to the current user, for example, the leftmost or rightmost position in the first interactive emoticon may be used as the specific position.

Figure 4A:
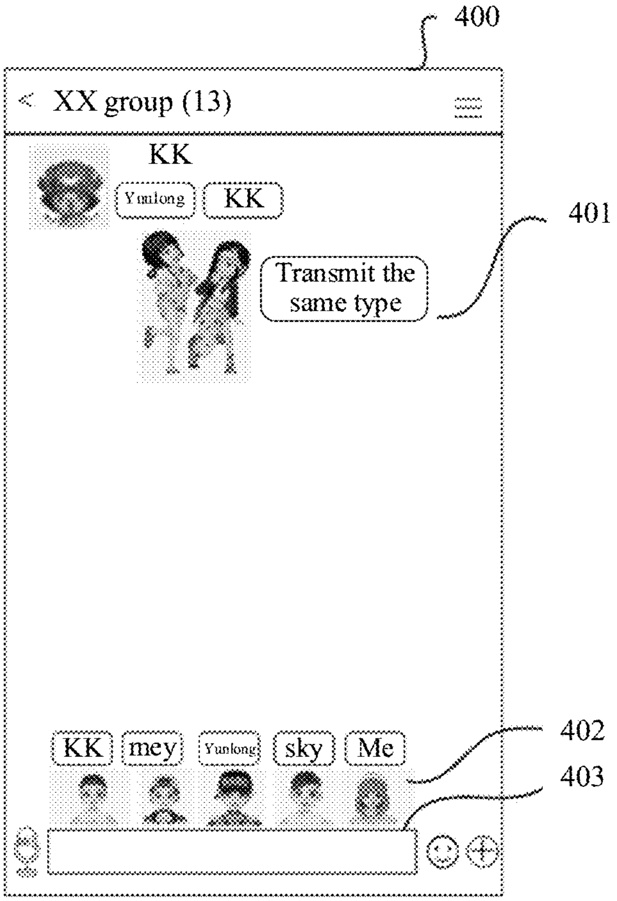
FIG. 4A to FIG. 4C are schematic diagrams of interfaces for transmitting two-person interactive emoticons in a group chat scenario according to an embodiment of this disclosure.
Figure 4B:
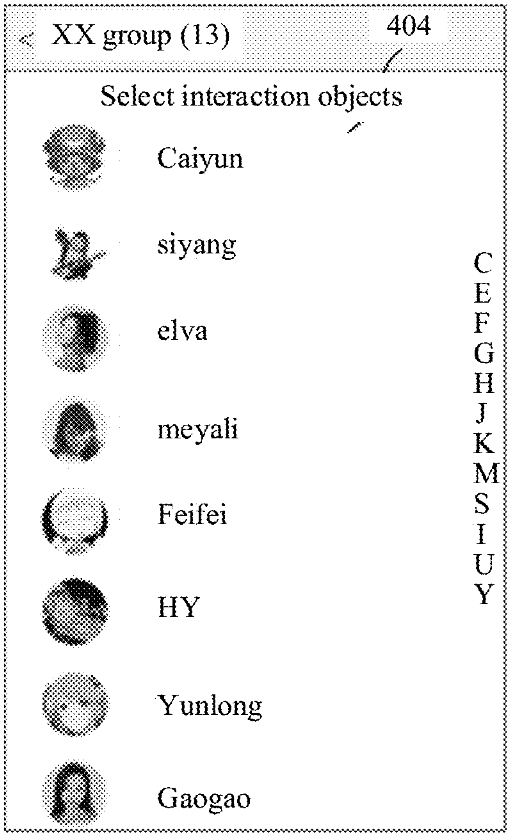
Figure 4C:
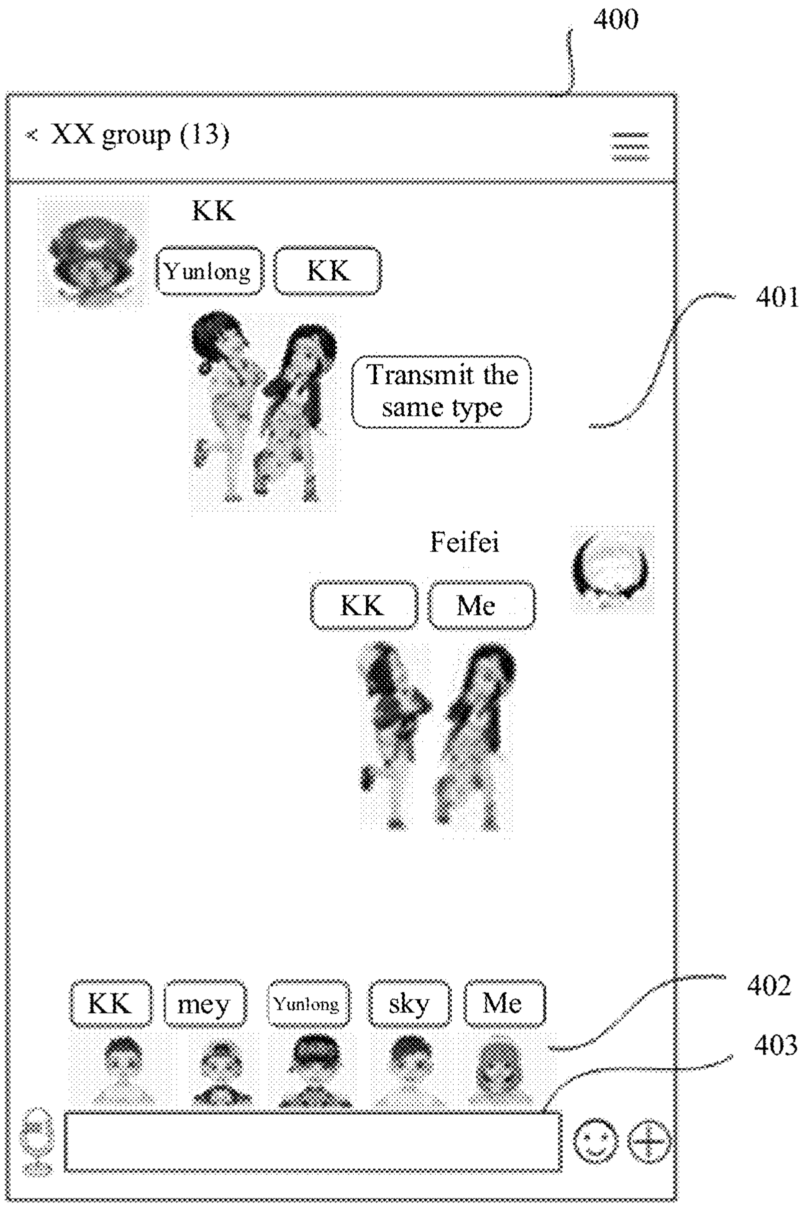

When the quantity of target interaction objects is less than the quantity of virtual objects in the first interactive emoticon, FIG. 4A to FIG. 4C are schematic diagrams of interfaces for transmitting a two-person interactive emoticon in a group chat scenario. As shown in FIG. 4A, a chat interface 400 includes a session region 401, a virtual object display region 402, and an input box region 403. A two-person interactive emoticon transmitted by a chat object is displayed in the session region 401. A virtual image on the left side of the two-person interactive emoticon is a virtual image corresponding to identifier information "Yunlong", and a virtual image on the right side is a virtual image and identifier information of the chat object "KK" transmitting the interactive emoticon. After the current user triggers a same-type emoticon transmitting control "Transmit the same type", an interaction object selection list 404 is displayed in the chat interface 400. As shown in FIG. 4B, the interaction object selection list 404 displays profile photos and identifier information of all chat objects in the chat group. In response to a trigger operation performed by the current user on a target interaction object in the interaction object selection list 404 or a selection control (not shown) corresponding to the target interaction object, a virtual image and identifier information of the target interaction object may be obtained, for example, HY is selected as a target interaction object. A second interactive emoticon formed according to the two-person interactive emoticon and a virtual image and identifier information of the target interaction object is displayed in the chat interface 400. As shown in FIG. 4C, the left side of the second interactive emoticon is the virtual image and an object identifier of the target interaction object HY, and the right side is the virtual image and an object identifier of KK.

Figure 5A:
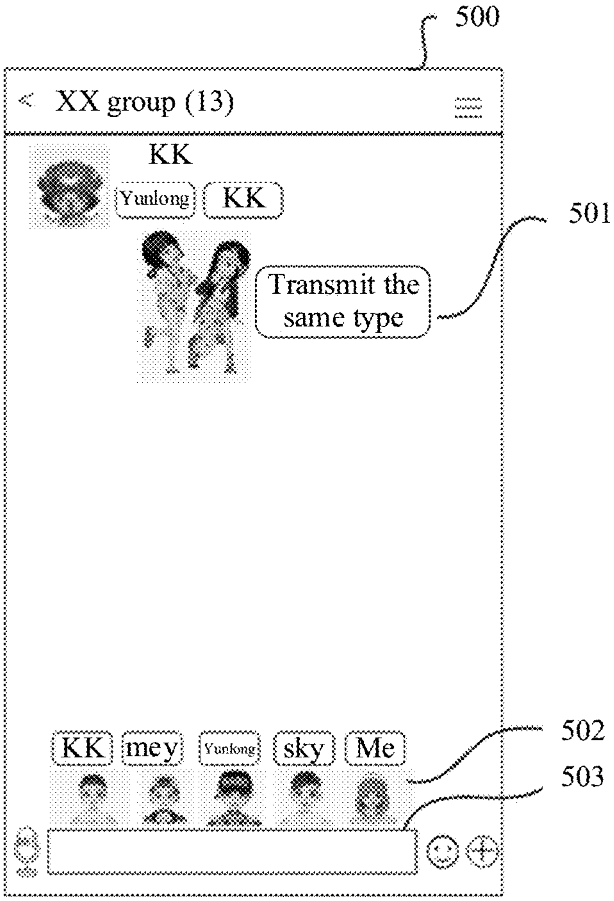
FIG. 5A to FIG. 5C are schematic diagrams of interfaces for transmitting two-person interactive emoticons in a group chat scenario according to an embodiment of this disclosure.
Figure 5B:
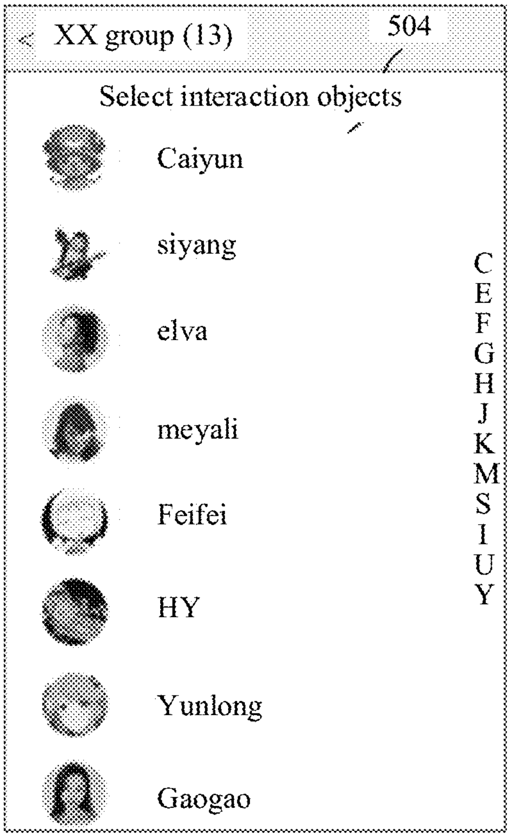
Figure 5C:
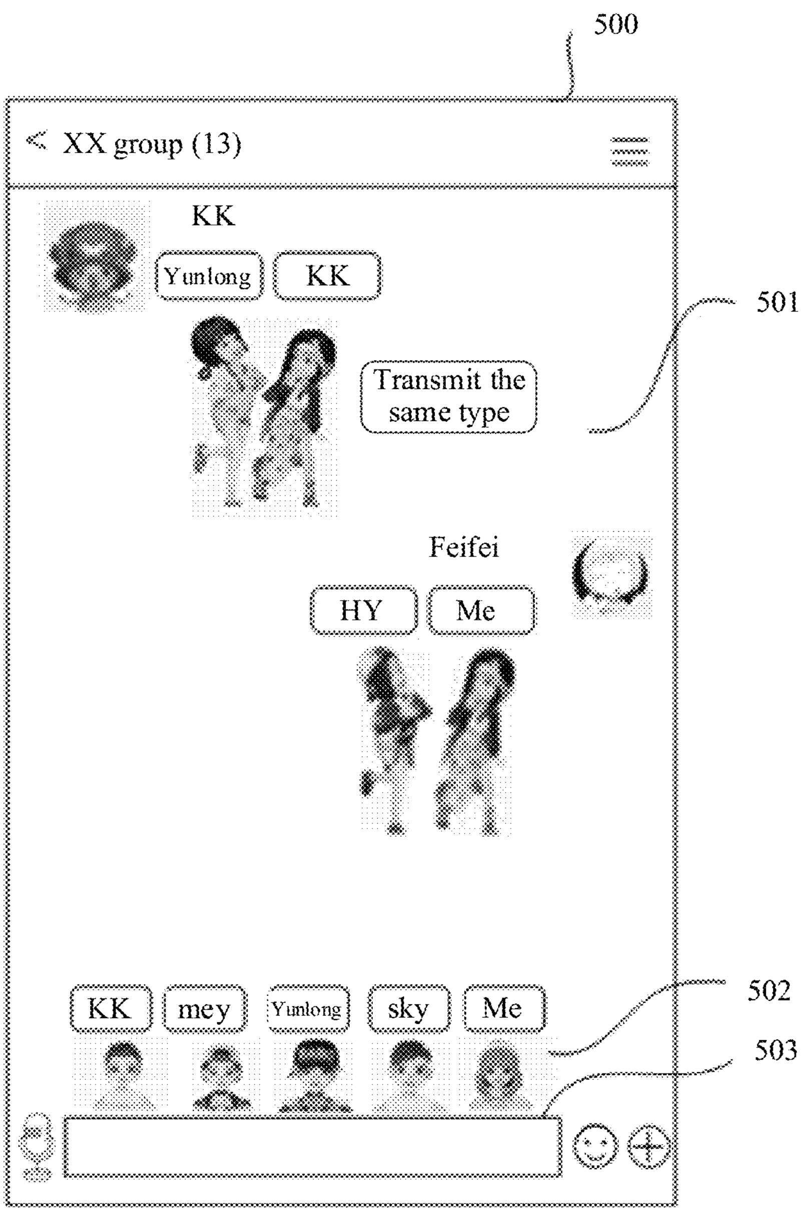

When the quantity of target interaction objects is less than the quantity of virtual objects, and a virtual object that is not replaced by a target interaction object is replaced with the virtual object corresponding to the current user, FIG. 5A to FIG. 5C are schematic diagrams of interfaces for transmitting a two-person interactive emoticon in a group chat scenario. As shown in FIG. 5A, a chat interface 500 includes a session region 501, a virtual object display region 502, and an input box region 503. A two-person interactive emoticon transmitted by a chat object is displayed in the session region 501. A virtual image on the left side of the two-person interactive emoticon is a virtual image corresponding to identifier information "Yunlong", and a virtual image on the right side is a virtual image and identifier information of the chat object "KK" transmitting the interactive emoticon. After the current user triggers a same-type emoticon transmitting control "Transmit the same type", an interaction object selection list 504 is displayed in the chat interface 500. As shown in FIG. 5B, the interaction object selection list 504 displays profile photos and identifier information of all chat objects in the chat group. In response to a trigger operation performed by the current user on a target interaction object in the interaction object selection list 504 or a selection control (not shown) corresponding to the target interaction object, a virtual image and identifier information of the target interaction object may be obtained, for example, HY is selected as a target interaction object. A second interactive emoticon formed according to the two-person interactive emoticon, a virtual image and identifier information of the target interaction object, and the virtual image and identifier information of the current user is displayed in the chat interface 500. As shown in FIG. 4C, the left side of the second interactive emoticon is the virtual image and an object identifier of the target interaction object HY, and the right side is the virtual image and an object identifier of the current user.

Figure 6A:
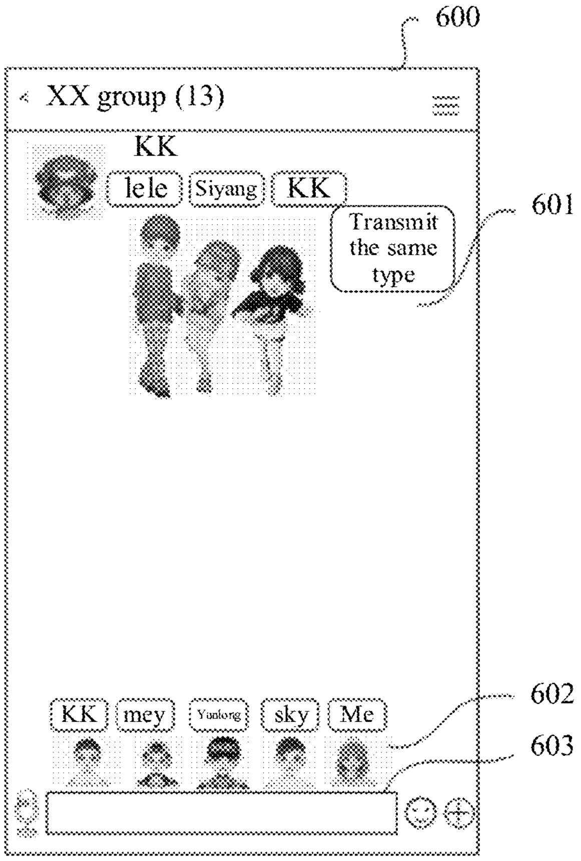
FIG. 6A to FIG. 6C are schematic diagrams of interfaces for transmitting three-person interactive emoticons in a group chat scenario according to an embodiment of this disclosure.
Figure 6B:
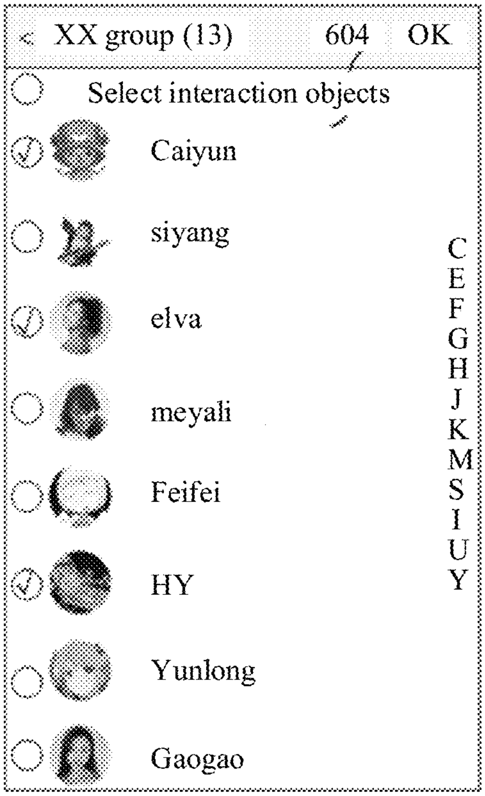
Figure 6C:
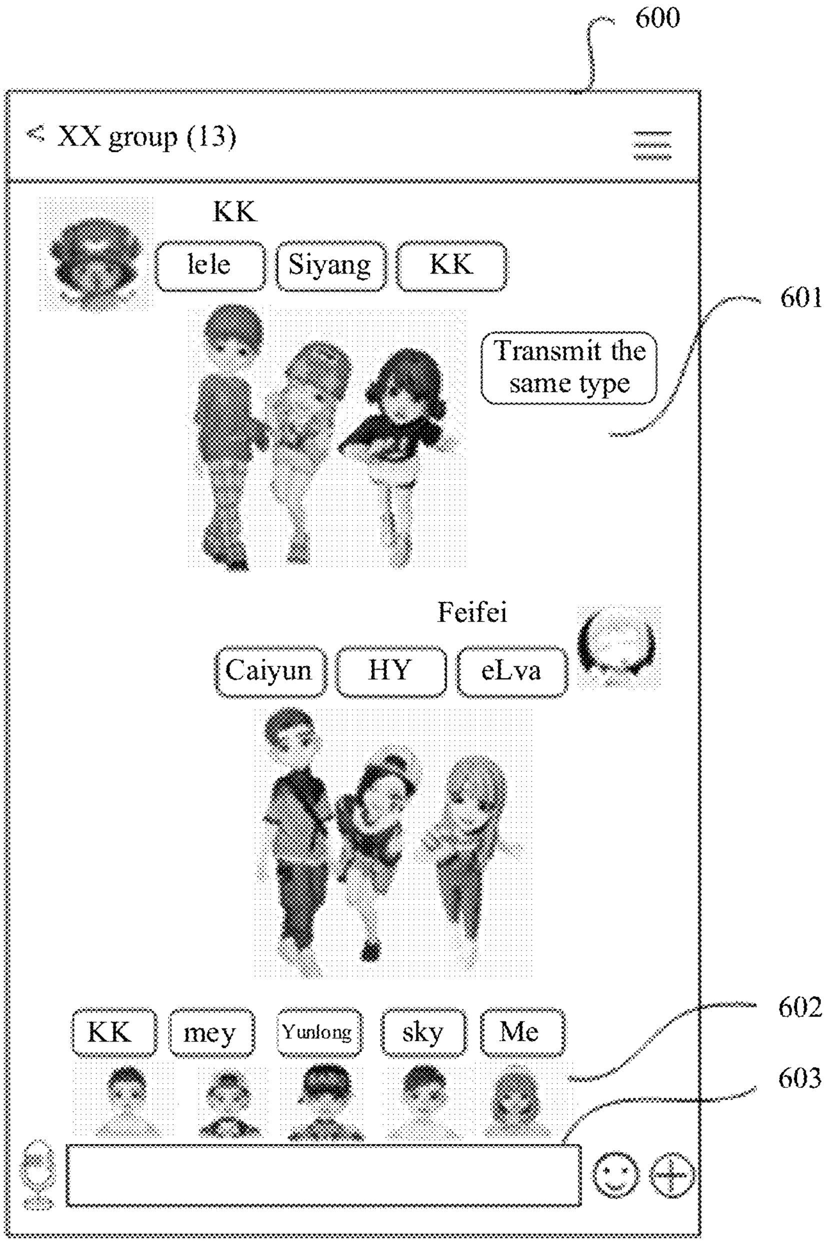

FIG. 6A to FIG. 6C are schematic diagrams of interfaces for transmitting a three-person interactive emoticon in a group chat scenario. As shown in FIG. 6A, a chat interface 600 includes a session region 601, a virtual object display region 602, and an input box region 603. A three-person interactive emoticon transmitted by a chat object is displayed in the session region 601. A virtual image on the left side of the three-person interactive emoticon is a virtual image corresponding to identifier information "lele", a virtual image in the middle is a virtual image corresponding to identifier information "Siyang", and a virtual image on the right side is a virtual image and identifier information "KK" of a chat object transmitting the interactive emoticon. After the current user triggers a same-type emoticon transmitting control "Transmit the same type", an interaction object selection list 604 is displayed in the chat interface 600. As shown in FIG. 6B, the interaction object selection list 604 displays profile photos and object identifiers of all chat objects in the chat group. In response to a trigger operation performed by the current user on a target interaction object in the interaction object selection list 604 or a selection control corresponding to the target interaction object, identifier information of the target interaction object may be obtained, and a second interactive emoticon formed according to the three-person interactive emoticon and a virtual image and identifier information of the target interaction object is displayed in the chat interface 600. As shown in FIG. 6C, the left side of the second interactive emoticon is a virtual image and identifier information of a target interaction object "Caiyun", the middle is a virtual image and an object identifier of a target interaction object "HY", and the right side is a virtual image and an object identifier of a target interaction object "elva".

The selection control corresponding to the target interaction object may be a selection box disposed on the left side of the profile photo of the interaction object, or may be a selection box disposed on the right side of the identifier information of the interaction object, or may be the profile photo and the identifier information of the interaction object. That is, a press operation may be performed on the profile photo or the identifier information of the interaction object to select the target interaction object. The press operation may be specifically a tap operation, a double tap operation, a long-press operation, or the like. Because multiple target interaction objects need to be selected from the interaction object selection list, after one target interaction object is selected, a check mark is displayed in a selection box corresponding to the target interaction object, as shown by a check mark in FIG. 6B. A color of a profile photo and an identifier corresponding to the target interaction object may also change to indicate selection, and this may alternatively in be another expression manner. This is not specifically limited in this embodiment of this disclosure. After all target interaction objects are selected, an OK control is triggered to display the second interactive emoticon in the chat interface.

In an embodiment of this disclosure, the same-type emoticon transmitting control may be in another form in addition to the "Transmit the same type" shown in FIG. 3A and FIG. 3B, FIG. 4A to FIG. 4C, FIG. 5A to FIG. 5C, and FIG. 6A to FIG. 6C, for example, may be an identifier such as "+", "+1", or "R", or may be a statement such as "Transmit a same type of interactive emoticon".

Figure 7A:
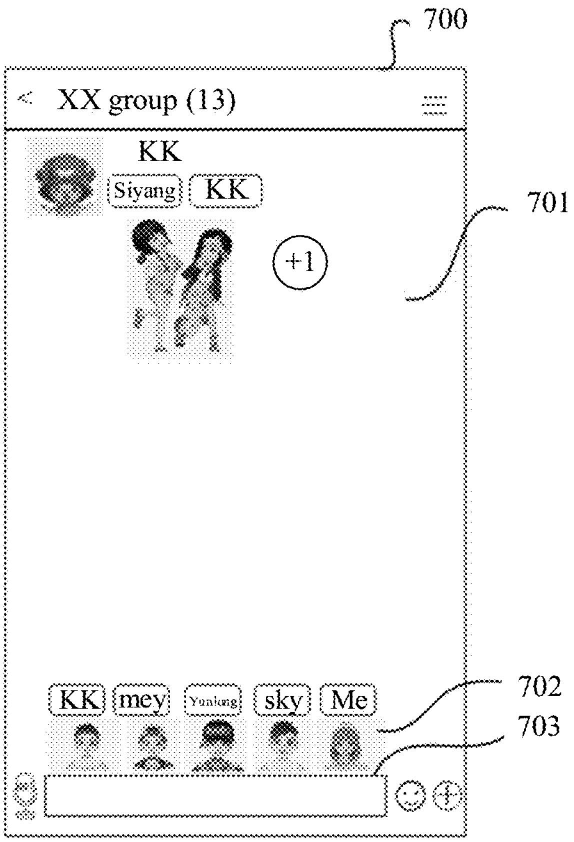
FIG. 7A to FIG. 7C are schematic diagrams of interfaces for transmitting two-person interactive emoticons in a group chat scenario according to an embodiment of this disclosure.
Figure 7B:
Figure 7C:
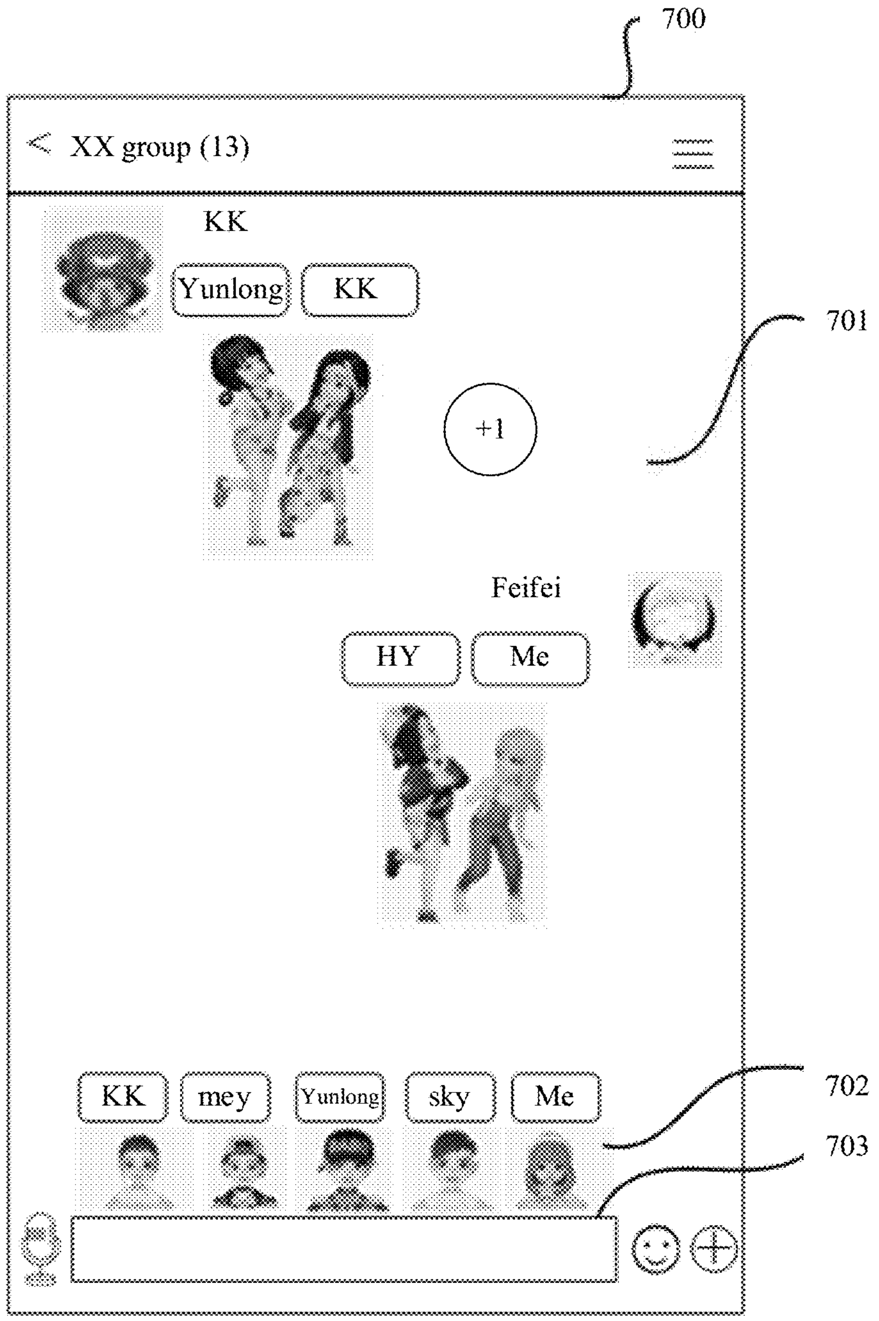

FIG. 7A to FIG. 7C are schematic diagrams of interfaces for transmitting a two-person interactive emoticon in a group chat scenario. As shown in FIG. 4A, a chat interface 700 includes a session region 701, a virtual object display region 702, and an input box region 703. A two-person interactive emoticon transmitted by a chat object is displayed in the session region 701. A virtual image on the left side of the two-person interactive emoticon is a virtual image corresponding to an object identifier "Yunlong", and a virtual image on the right side is a virtual image and identifier information of the chat object "KK" transmitting the interactive emoticon. After the current user triggers a same-type emoticon transmitting control "+1", an interaction object selection list 704 is displayed in the chat interface 700. As shown in FIG. 7B, the interaction object selection list 704 displays profile photos and identifier information of all chat objects in the chat group. In response to a trigger operation performed by the current user on a target interaction object in the interaction object selection list 704 or a selection control corresponding to the target interaction object, a virtual image and identifier information of the target interaction object may be obtained. A second interactive emoticon formed according to the two-person interactive emoticon and a virtual image and identifier information of the target interaction object is displayed in the chat interface 700. As shown in FIG. 4C, the left side of the second interactive emoticon is the virtual image and an object identifier of the target interaction object HY, and the right side is the virtual image and an object identifier of the current user.

Figure 8A:
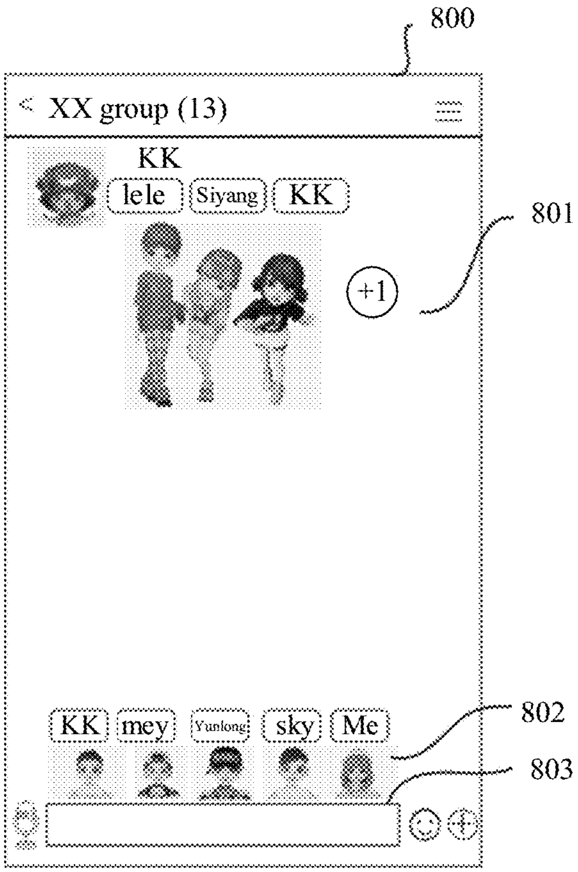
FIG. 8A to FIG. 8C are schematic diagrams of interfaces for transmitting three-person interactive emoticons in a group chat scenario according to an embodiment of this disclosure.
Figure 8B:
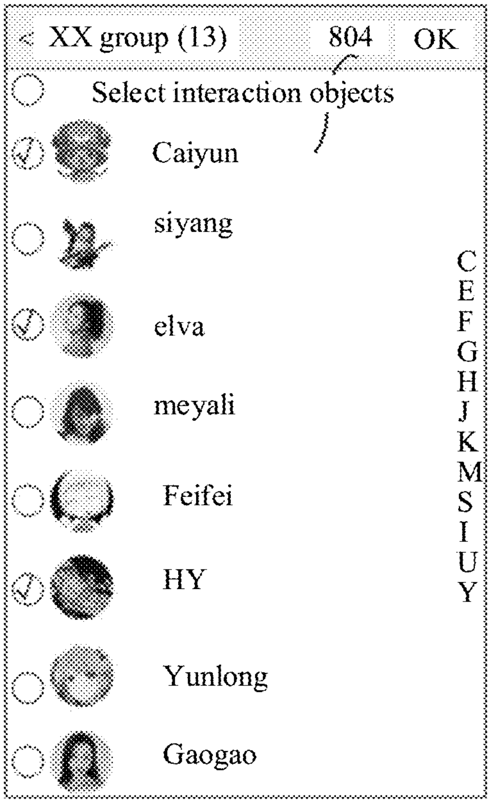
Figure 8C:
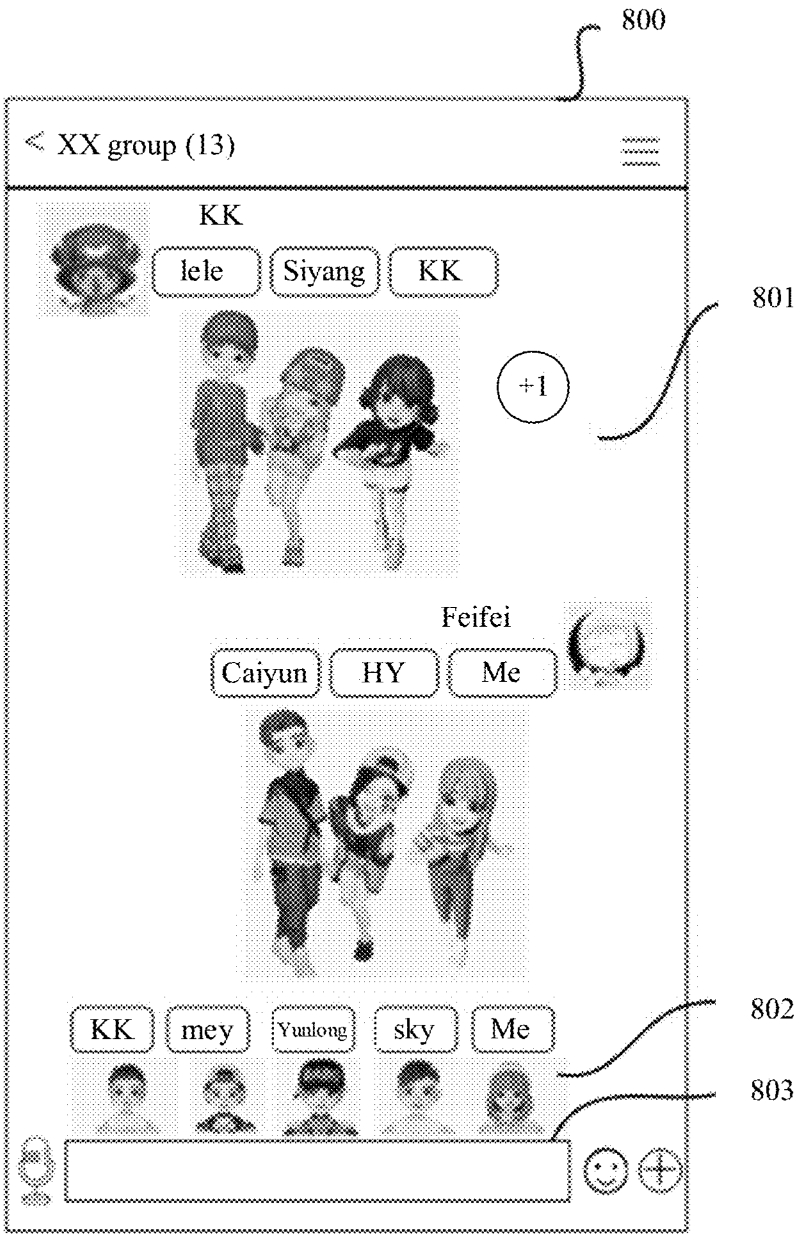

FIG. 8A to FIG. 8C are schematic diagrams of interfaces for transmitting a three-person interactive emoticon in a group chat scenario. As shown in FIG. 6A, a chat interface 800 includes a session region 801, a virtual object display region 802, and an input box region 803. A three-person interactive emoticon transmitted by a chat object is displayed in the session region 801. A virtual image on the left side of the three-person interactive emoticon is a virtual image corresponding to identifier information "lele", a virtual image in the middle is a virtual image corresponding to identifier information "Siyang", and a virtual image on the right side is a virtual image and identifier information of a chat object KK transmitting the interactive emoticon. After the current user triggers a same-type emoticon transmitting control "+1", an interaction object selection list 804 is displayed in the chat interface 800. As shown in FIG. 8B, the interaction object selection list 804 displays profile photos and identifier information of all chat objects in the chat group. In response to a trigger operation performed by the current user on a target interaction object in the interaction object selection list 804 or a selection control corresponding to the target interaction object, a virtual image and identifier information of the target interaction object may be obtained, and a second interactive emoticon formed according to the three-person interactive emoticon and a virtual image and identifier information of the target interaction object is displayed in the chat interface 800. As shown in FIG. 8C, the left side of the second interactive emoticon is a virtual image and identifier information of a target interaction object "Caiyun", the middle is a virtual image and identifier information of a target interaction object "HY", and the right side is a virtual image and identifier information of a target interaction object "elva".

Figure 9:
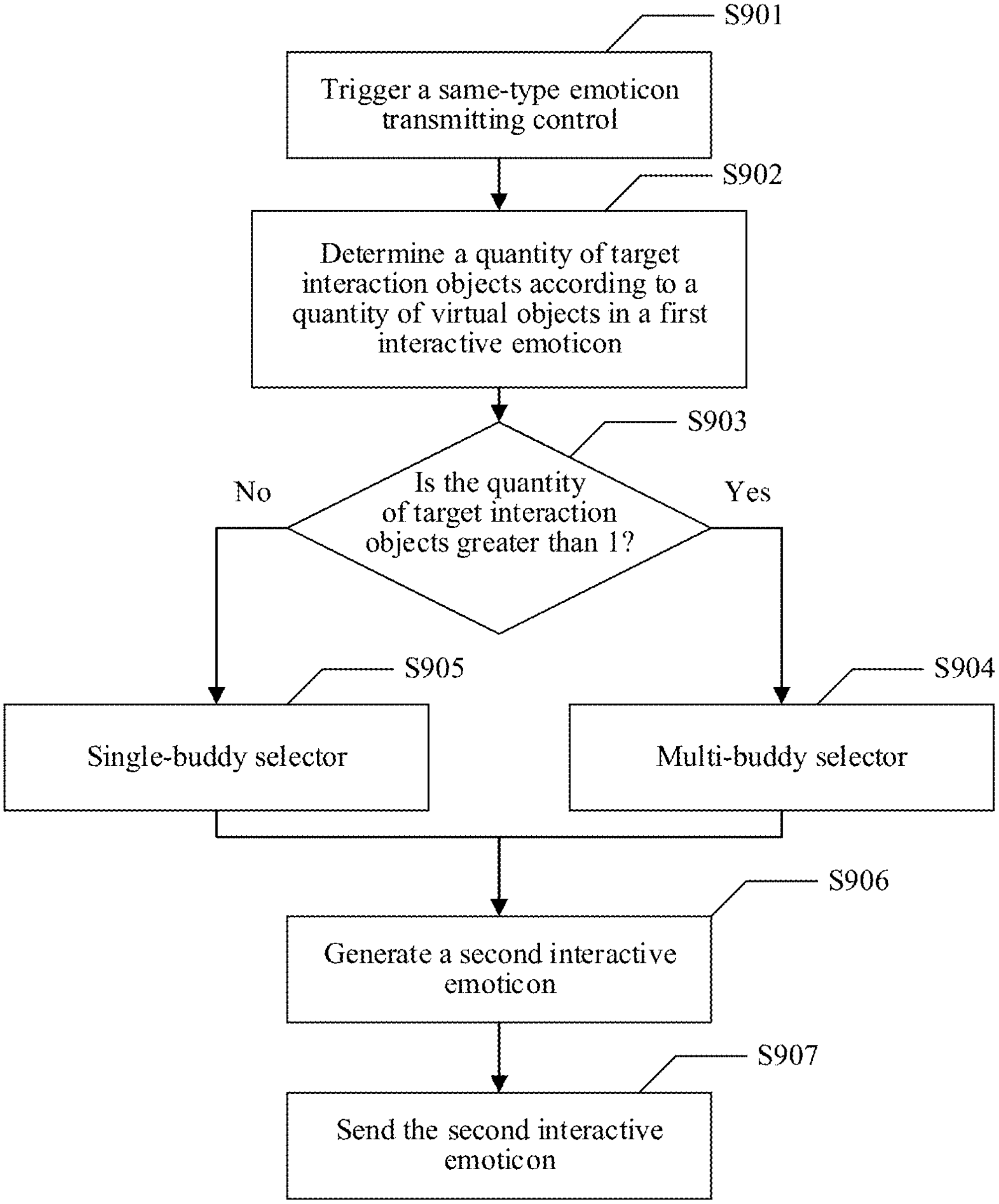
FIG. 9 is a schematic flowchart of triggering a same-type emoticon transmitting control to transmit an interactive emoticon according to an embodiment of this disclosure.

Based on the schematic diagrams of the interfaces shown in FIG. 3A and FIG. 3B, FIG. 4A to FIG. 4C, FIG. 5A to FIG. 5C, FIG. 6A to FIG. 6C, FIG. 7A to FIG. 7C, and FIG. 8A to FIG. 8C, for different interactive emoticons, corresponding logic in the case of transmitting a same type of interactive emoticon is different. FIG. 9 is a schematic flowchart of triggering a same-type emoticon transmitting control to transmit an interactive emoticon. As shown in FIG. 9, Step S901: Trigger a same-type emoticon transmitting control corresponding to a first interactive emoticon; Step S902: Obtain a quantity of virtual objects in the first interactive emoticon, and determine a quantity of target interaction objects according to the quantity of virtual objects; Step S903: Determine whether the quantity of target interaction objects is greater than 1, and if yes, perform step S904, or if no, perform step S905; Step S904: Activate a multi-chat object selector, and respond to a trigger operation on a target interaction object or a selection control corresponding to the target interaction object by using the multi-chat object selector; Step S905: Activate a single-chat object selector, and respond to a trigger operation on a target interaction object or a selection control corresponding to the target interaction object by using the single-chat object selector; Step S906: Perform real-time multi-person expression recording according to a virtual image and identifier information of a selected target interaction object, to generate a second interactive emoticon; and Step S907: Transmit the second interactive emoticon.

Further, when a quantity of selected target interaction objects is less than the quantity of virtual objects in the first interactive emoticon, and the second interactive emoticon is being generated, real-time multi-person expression recording may be further performed according to the target interaction object and a virtual image and identifier information of a current user, so as to generate the second interactive emoticon.

In an embodiment of this disclosure, when the second interactive emoticon is generated according to the first interactive emoticon and the virtual image and the identifier information of the target interaction object, or according to the first interactive emoticon, the virtual image and the identifier information of the target interaction object, and the virtual image and the identifier information of the current user, a virtual image and identifier information of the virtual object in the first interactive emoticon may be replaced with the virtual image and the identifier information of the target interaction object, or the virtual image and the identifier information of the virtual object in the first interactive emoticon may be replaced with the virtual images and the identifier information corresponding to the target interaction object and the current user, so as to generate the second interactive emoticon.

(II) The trigger operation on the first interactive emoticon in the chat interface is a press operation on the first interactive emoticon.

In an embodiment of this disclosure, the press operation on the first interactive emoticon triggering selection of the target interaction object is applicable to an interactive emoticon displayed in a session region and an interactive emoticon displayed in an emoticon display region, and a procedure of triggering selection of the target interaction object by performing a press operation on the first interactive emoticon is the same as a procedure of triggering selection of the target interaction object by performing a trigger operation on the same-type emoticon transmitting control corresponding to the first interactive emoticon. After the press operation on the first interactive emoticon is responded to, an interaction object selection list is displayed in the chat interface, and selection of the target interaction object is triggered in response to a trigger operation on the target interaction object in the interaction object selection list or the selection control corresponding to the target interaction object.

In an embodiment of this disclosure, the press operation may be specifically a long-press operation or a tap operation. When the press operation is a long-press operation, a duration threshold may be set. When duration of the long-press operation is greater than the duration threshold, the interaction object selection list is called out, so as to select the target interaction object from the interaction object selection list. For example, the duration threshold may be set to 3 s, 5 s, or the like. When the press operation is a tap operation, the interaction object selection list may be called out in a manner such as tapping, double tapping, or triple tapping, so as to select the target interaction object from the interaction object selection list. This embodiment of this disclosure sets no specific limitation on the duration threshold corresponding to the long-press operation and a specific tap manner corresponding to the tap operation.

In an embodiment of this disclosure, when the target interaction object is being selected, the quantity of target interaction objects may be determined according to the quantity of virtual objects in the first interactive emoticon. That is, the quantity of target interaction objects is less than or equal to the quantity of virtual objects in the first interactive emoticon. When the second interactive emoticon is generated according to the first interactive emoticon and object information of the target interaction object, virtual images and identifier information of all or some virtual objects in the first interactive emoticon may be replaced with virtual images and identifier information of target interaction objects. A specific processing procedure is the same as the procedure of generating the second interactive emoticon in (I). Details are not described herein again.

Figure 10A:
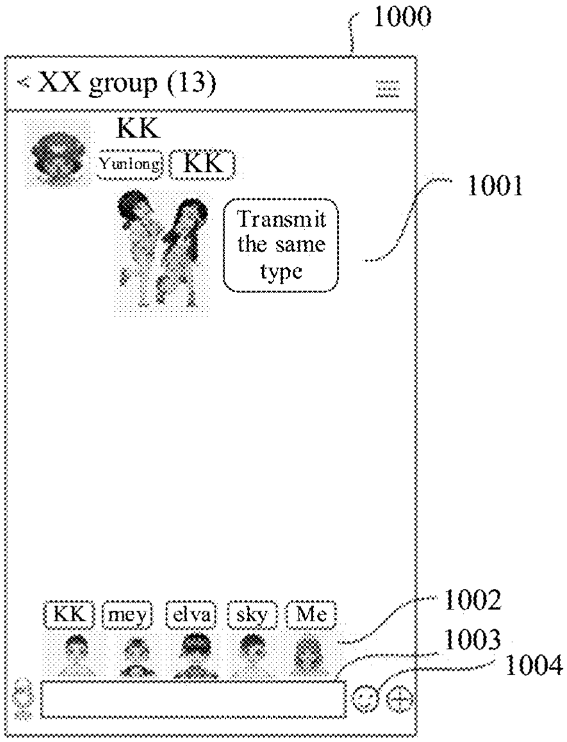
FIG. 10A to FIG. 10E are schematic diagrams of interfaces for performing a press operation on an interactive emoticon in an emoticon display region to transmit a same type of interactive emoticon according to an embodiment of this disclosure.
Figure 10B:
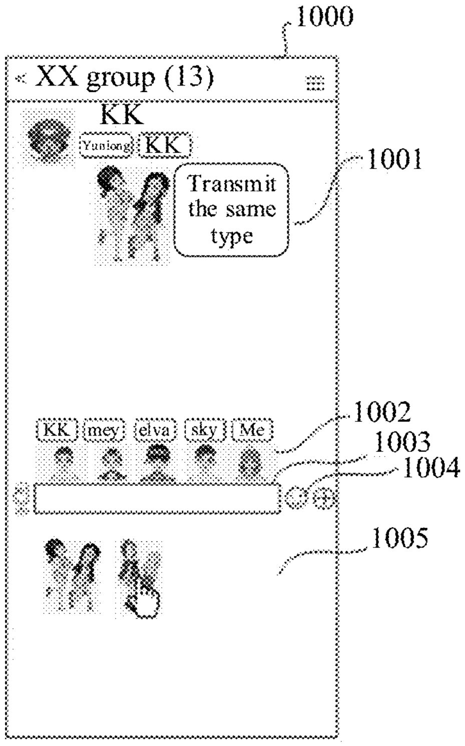
Figure 10C:
Figure 10D:
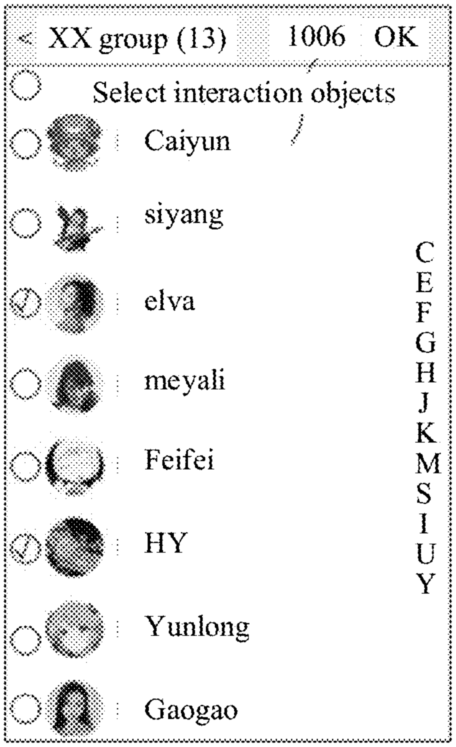
Figure 10E:
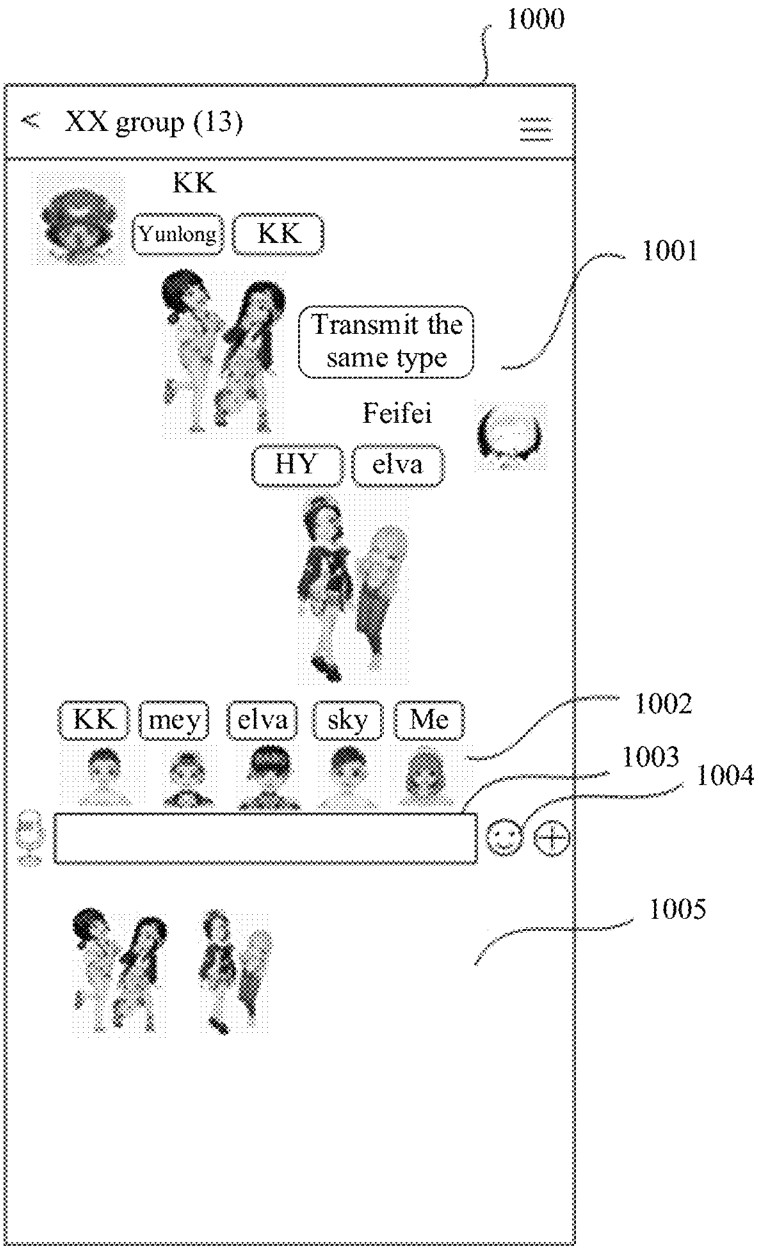

FIG. 10A to FIG. 10E are schematic diagrams of interfaces for performing a press operation on an interactive emoticon in an emoticon display region to transmit a same type of interactive emoticon. As shown in FIG. 10A, a chat interface 1000 includes a session region 1001, a virtual object display region 1002, and an input box region 1003, and an emoticon list control 1004 is disposed side by side with the input box region 1003. By triggering the emoticon list control 1004, the emoticon display region 1005 may be expanded below the input box region 1003, and an interactive emoticon in an interactive emoticon library is displayed in the emoticon display region 1005, as shown in FIG. 10B. After determining a first interactive emoticon that needs to be transmitted, a current user may perform a press operation on the first interactive emoticon, so as to call an interaction object selection list 1006, as shown in FIG. 10C. A trigger operation is performed on an interaction object in the interaction object selection list 1006 or a selection control corresponding to the interaction object to select target interaction objects, as shown in FIG. 10D, where the target interaction objects are "HY" and "elva". An OK control in the interaction object selection list 1006 is triggered to display a second interactive emoticon generated according to the first interactive emoticon and object information of the target interaction objects in the chat interface. As shown in FIG. 10E, the left side of the second interactive emoticon is a virtual image and identifier information corresponding to "HY", and the right side is a virtual image and identifier information corresponding to "elva".

(III) The trigger operation on the first interactive emoticon in the chat interface is a drag operation on the first interactive emoticon.

In an embodiment of this disclosure, similar to a press operation, a drag operation on the first interactive emoticon is also applicable to an interactive emoticon displayed in a session region and an interactive emoticon displayed in an emoticon display region. To improve transmitting convenience and transmitting efficiency of the interactive emoticon, a first interactive emoticon that needs to be transmitted may be dragged from the session region or the emoticon display region to a target virtual object in a virtual object display region, and the first interactive emoticon is released, so as to generate a second interactive emoticon by processing the first interactive emoticon according to a virtual image and identifier information corresponding to a target virtual object, and display the second interactive emoticon in a chat interface. In addition, the first interactive emoticon that needs to be transmitted may be dragged from the session region or the emoticon display region to an input box, a target interaction object is selected, then a second interactive emoticon is generated by processing the first interactive emoticon according to a virtual image and identifier information of the target interaction object, and the second interactive emoticon is transmitted to the session region of the chat interface in response to a trigger operation on a transmitting control.

In an embodiment of this disclosure, when a target interaction object is being selected, a quantity of target interaction objects may be less than or equal to a quantity of virtual objects in the first interactive emoticon. When the quantity of target interaction objects is less than the quantity of virtual objects in the first interactive emoticon, any virtual object that is corresponding to the quantity of target interaction objects and that is in the first interactive emoticon may be replaced with the target interaction object, and non-replaced virtual objects may remain unchanged, or one of the non-replaced virtual objects is replaced with a virtual image and identifier information of a current user. By replacing the virtual object with the virtual image and the identifier information of the current user, interaction between the current user and a selected target interaction object can be enhanced, and interest of the interactive emoticon can be improved.

Next, the foregoing two drag manners are described in detail.

Figure 11A:
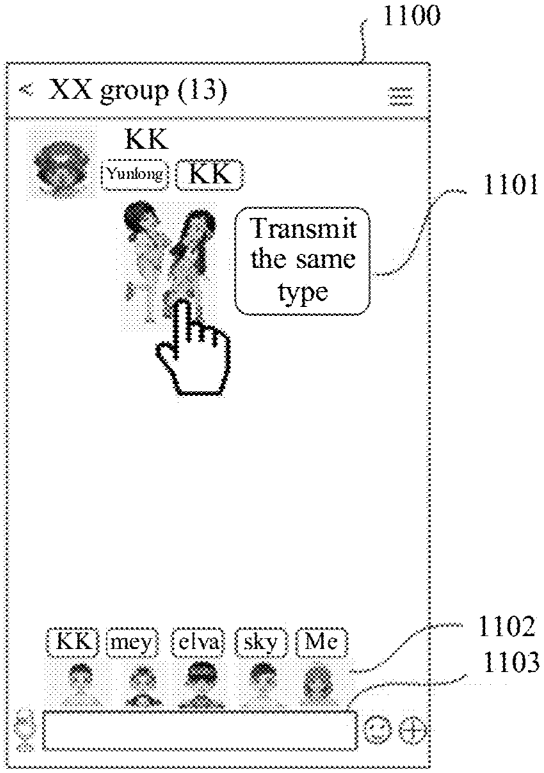
FIG. 11A to FIG. 11D are schematic diagrams of interfaces for dragging an interactive emoticon from a session region to a virtual object display region to transmit a same type of interactive emoticon according to an embodiment of this disclosure.
Figure 11B:
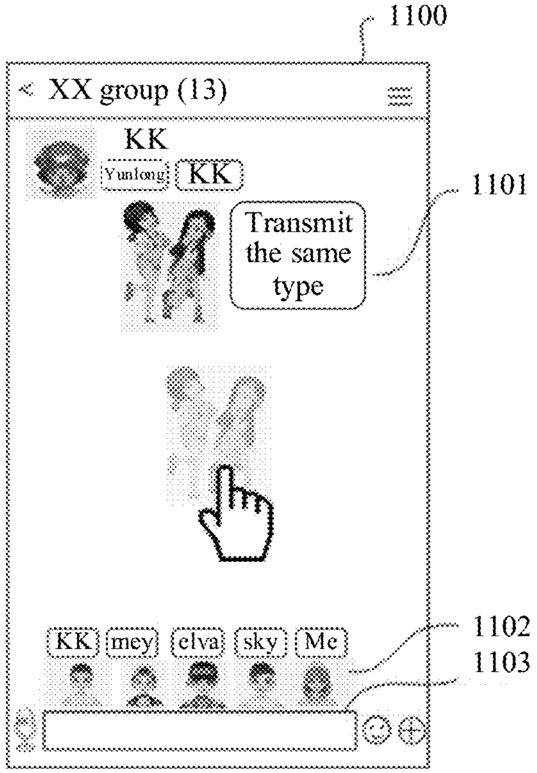
Figure 11C:
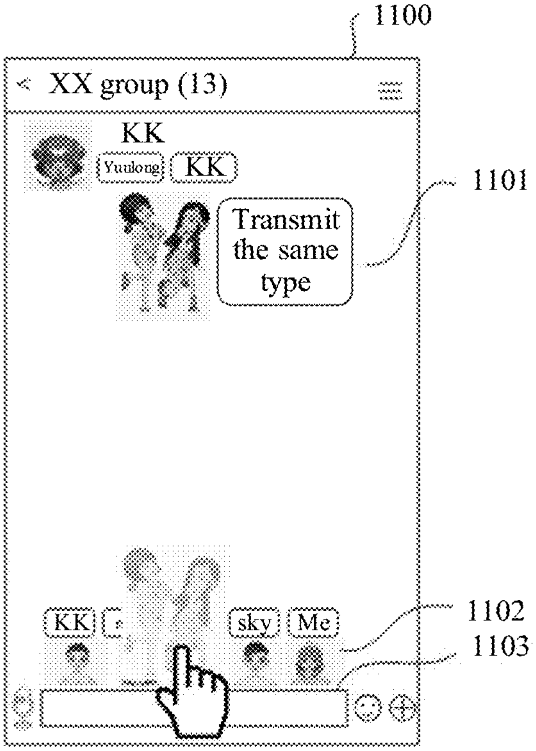
Figure 11D:
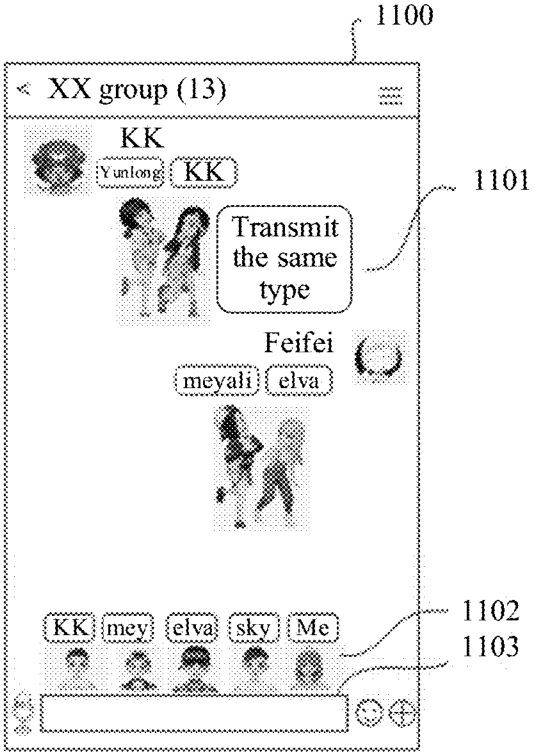

FIG. 11A to FIG. 11D are schematic diagrams of interfaces for dragging an interactive emoticon from a session region to a virtual object display region to transmit a same type of interactive emoticon. As shown in FIG. 11A, a chat interface 1100 includes a session region 1101, a virtual object display region 1102, and an input box region 1103. A long-press operation on a first interactive emoticon in the session region 1101 is responded to, so that the first interactive emoticon is in a floating state, and the first interactive emoticon is an emoticon that has an interactive effect between two virtual objects. As shown in FIG. 11B, the first interactive emoticon is dragged to the virtual object display region 1102, and virtual images and identifier information of four chat objects and a virtual image and identifier information of a current user are displayed in the virtual object display region 1102, the four chat objects are respectively kk, meyali, elva, and sky. The first interactive emoticon is dragged to cover to-be-selected virtual objects in the virtual object display region 1102. As shown in FIG. 11C, the covered to-be-selected virtual objects are a virtual object whose identifier information is "meyali" and a virtual object whose identifier information is "elva". The covered to-be-selected virtual objects are determined as target interaction objects to release the first interactive emoticon, and a second interactive emoticon generated according to virtual images and identifier information of the target interaction objects and the first interactive emoticon is displayed on the chat interface 1100. As shown in FIG. 11D, the left side of the second interactive emoticon is the virtual image of the target interaction object meyali, identifier information meyali is displayed in an identifier display region above the virtual image, the right side is the virtual image of elva, and identifier information elva is displayed in the identifier display region above the virtual image.

When the first interactive emoticon is dragged to cover a target virtual object, the target virtual object may be determined according to coverage of the first interactive emoticon to a to-be-selected virtual object. When the first interactive emoticon covers multiple to-be-selected virtual objects at the same time, the covered multiple to-be-selected virtual objects are used as target interaction objects. If a release operation of the current user on the first interactive emoticon is received, the second interactive emoticon is generated according to object information of the target interaction objects and the first interactive emoticon. If a release operation of the current user on the first interactive emoticon is not received, a target interaction object continues to be determined.

When the target interaction object is being selected, a display attribute of a covered virtual object changes, for example, a color, a size, a font, or the like of identifier information changes, a background color, a size, a display effect of the virtual object changes, and the like. In addition to the change of the display attribute, a vibrator may be triggered to vibrate to prompt the user that the interaction object is selected, and the user is prompted to determine whether the interaction object is a desired target interaction object. If the interaction object is the desired target interaction object, the first interactive emoticon is released, and if the interactive emoticon is not the target interactive emoticon, the first interactive emoticon continues to be dragged. A prompt may alternatively be provided in a manner of flashing a virtual image and/or an object identifier, and cooperating with a voice broadcast or the like. In this way, it may be convenient for the current user to obtain information about a target interaction object immediately and determine whether to continue dragging the first interactive emoticon, and is also more friendly to a user with a relatively poor sight.

Figure 12A:
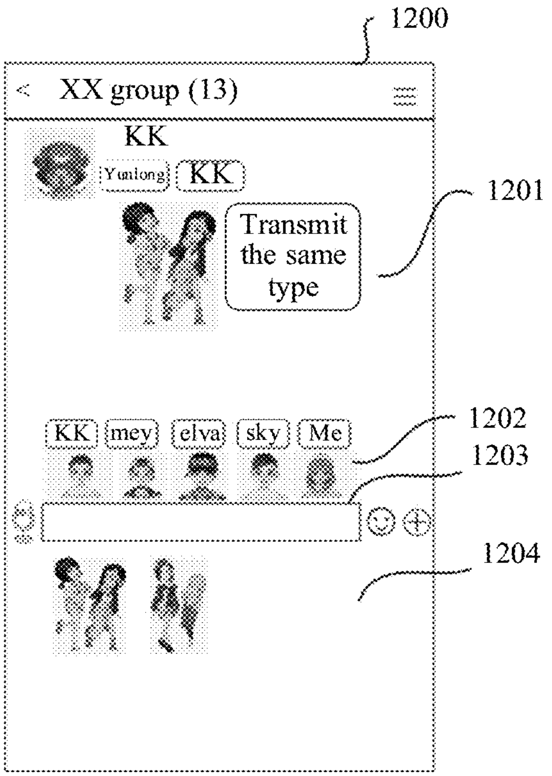
FIG. 12A to FIG. 12D are schematic diagrams of interfaces for dragging an interactive emoticon from an emoticon display region to a virtual object display region to transmit a same type of interactive emoticon according to an embodiment of this disclosure.
Figure 12B:
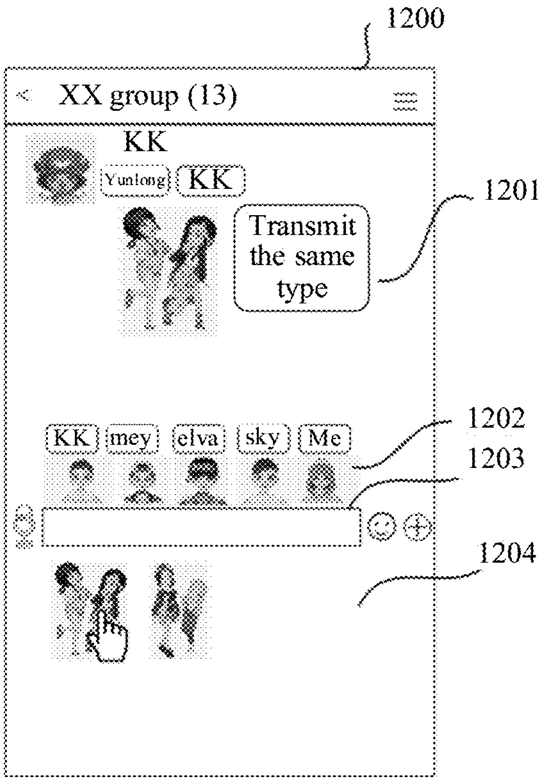
Figure 12C:
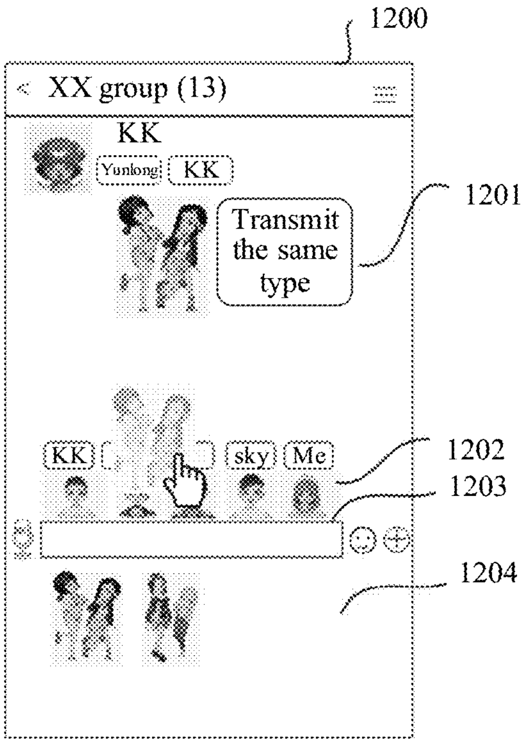
Figure 12D:
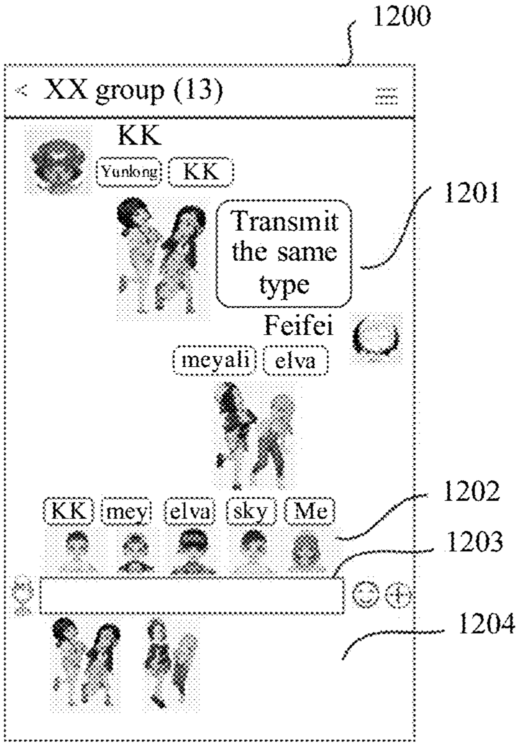

FIG. 12A to FIG. 12D are schematic diagrams of interfaces for dragging an interactive emoticon from an emoticon display region to a virtual object display region to transmit a same type of interactive emoticon. As shown in FIG. 12A, a chat interface 1200 includes a session region 1201, a virtual object display region 1202, an input box region 1203, and an emoticon display region 1204. As shown in FIG. 12B, a long-press operation on a first interactive emoticon in the emoticon display region 1204 is responded to, so that the first interactive emoticon is in a floating state. As shown in FIG. 12C, the first interactive emoticon is dragged to the virtual object display region 1202. Virtual images and identifier information of four chat objects and a virtual image and identifier information of a current user are displayed in the virtual object display region 1202, and the four chat objects are respectively kk, meyali, elva, and sky. The first interactive emoticon is dragged to cover to-be-selected virtual objects in the virtual object display region 1202 to determine target interaction objects, where the target interaction objects are a virtual object whose identifier information is “meyali” and a virtual object whose identifier information is “elva”. After the target interaction objects are confirmed, the first interactive emoticon is released, and a second interactive emoticon generated according to virtual images and identifier information of the chat objects meyali and the elva and the first interactive emoticon is displayed in the chat interface 1200. As shown in FIG. 12D, the left side of the second interactive emoticon is the virtual image of the target interaction object meyali, identifier information meyali is displayed in an identifier display region above the virtual image, the right side is the virtual image of elva, and identifier information elva is displayed in the identifier display region above the virtual image.

The solution of dragging the first interactive emoticon to the virtual object display region to transmit a same type of interactive emoticon is applicable to a group chat scenario, and is also applicable to a private chat scenario. Because the private chat scenario is a one-to-one chat scenario, to improve interest, the interactive emoticon also needs to be an interactive emoticon related to two persons. In the private chat scenario, a current user may drag the first interactive emoticon to cover a virtual object corresponding to a chat object, and then generate a second interactive emoticon according to the first interactive emoticon and a virtual image and identifier information of the chat object, where the second interactive emoticon includes virtual images and identifier information of the current user and the chat object. If the first interactive emoticon is dragged from the session region to the virtual object display region, the second interactive emoticon is generated by exchanging positions of the virtual images and the identifier information of the current user and the chat object in the first interactive emoticon. If the first interactive emoticon is dragged from the emoticon display region to the virtual object display region, a virtual image and identifier information of any virtual object in the first interactive emoticon may be randomly replaced with the virtual images and the identifier information of the current user and the chat object, so as to generate the second interactive emoticon.

In an embodiment of this disclosure, a display effect in the virtual object display region may be set according to an actual requirement. For example, the virtual image and the identifier information of the current user are displayed only in the virtual object display region, or virtual images and identifier information of a preset quantity of users may be displayed in the virtual object display region. As shown in FIG. 12A to FIG. 12D, virtual images and identifier information of four chat objects and the virtual image and the identifier information of the current user are displayed in the virtual object display region at the same time. Therefore, before the first interactive emoticon is dragged to the virtual object display region to transmit a same type of interactive emoticon, display information of the virtual object display region further needs to be determined.

Figure 13:
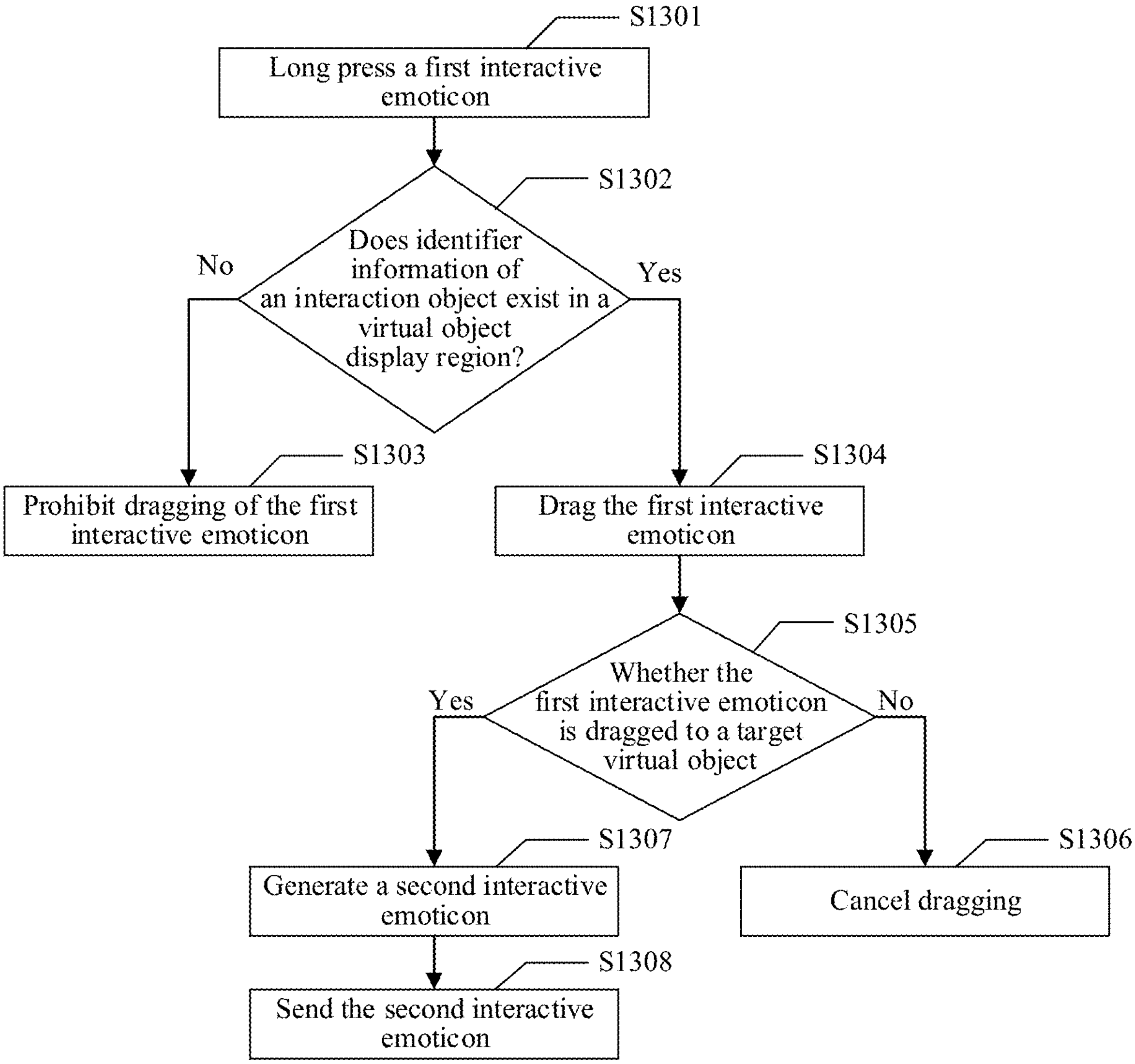
FIG. 13 is a schematic flowchart of dragging an interactive emoticon to a virtual object display region to transmit a same type of interactive emoticon according to an embodiment of this disclosure.

FIG. 13 is a schematic flowchart of dragging an interactive emoticon to a virtual object display region to transmit a same type of interactive emoticon. As shown in FIG. 13, Step S1301: Long press a first interactive emoticon; Step S1302: Determine whether identifier information of an interaction object exists in a virtual object display region, and if no, perform step S1303, or if yes, perform step S1304; Step S1303: Prohibit dragging of the first interactive emoticon; Step S1304: Drag the first interactive emoticon; Step S1305: Determine whether the first interactive emoticon is dragged to a target virtual object, and if no, perform step S1306, or if yes, perform step S1307; Step S1306: Cancel dragging of the first interactive emoticon, and invoke the first interactive emoticon to an initial display position; Step S1307: Process the first interactive emoticon according to a virtual image and identifier information of the target interaction object, to generate a second interactive emoticon; and Step S1308: Transmit the second interactive emoticon.

When whether the first interactive emoticon is dragged to the target interaction object is being determined, the determining may be performed by using an overlapping relationship between the first interactive emoticon and a to-be-selected virtual object, and if there is overlapping, the overlapped to-be-selected virtual object is used as a target interaction object. In this embodiment of this disclosure, when a target interaction object is not successfully determined according to the overlapping relationship within a preset time, a mode of selecting the target interaction object is switched from a multi-object selection mode to a single-object selection mode, that is, when the target interaction object is not successfully determined within the preset time, a separate target interaction object is determined according to the overlapping relationship between the first interactive emoticon and the to-be-selected virtual object, where the preset time may be, for example, 5 s or 10 s.

In the single-object selection mode, the target interaction object may be determined by determining whether a target corner of an emoticon determining region in the first interactive emoticon falls in a display region of a target virtual object. Specifically, a position, in the virtual object display region, of the target corner of the emoticon determining region in the first interactive emoticon is obtained. When the position is located in the display region of the target virtual object, the target virtual object is used as a target interaction object, and then the first interactive emoticon may be released, so as to generate a second interactive emoticon according to object information of the target interaction object and the first interactive emoticon.

Further, the emoticon determining region is an emoticon region that is in the first interactive emoticon and whose area is less than an area of a display region of each to-be-selected virtual object in the virtual object display region, for example, the display region of each to-be-selected virtual image is a region of 5×5. In this case, a region of 3×3 may be truncated from the first interactive emoticon as the emoticon determining region.

Figure 14:
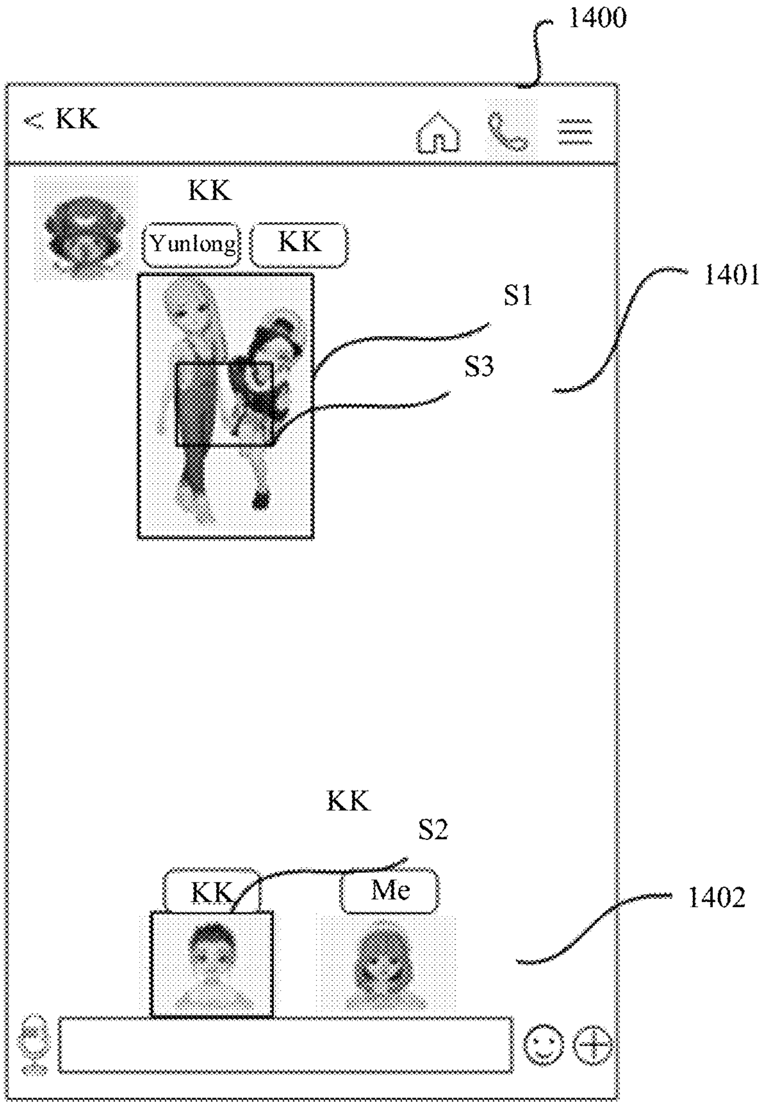
FIG. 14 is a schematic diagram of an interface of an emoticon determining region according to an embodiment of this disclosure.

FIG. 14 is a schematic diagram of an interface of an emoticon determining region. As shown in FIG. 14, a first interactive emoticon is displayed in a session region 1401 of a chat interface 1400. A size of the first interactive emoticon is corresponding to a border S1, and a size of each to-be-selected virtual image in a virtual image display region 1402 is corresponding to a border S2. A region whose area is less than an area of S2 may be truncated in the border S1 of the first interactive emoticon as an emoticon determining region, for example, a region shown by a border S3. In this embodiment of this disclosure, the emoticon determining region may be located at the center of the first interactive emoticon, or may be located in another region in the first interactive emoticon. However, an effect of setting the emoticon determining region at the center of the first interactive emoticon is optimal according to determining precision.

When the target virtual object is being determined, the determining is performed according to the position of the target corner of the emoticon determining region. The emoticon determining region shown in FIG. 14 continues to be used as an example for description. The emoticon determining region S3 includes four corners: a lower left corner, a lower right corner, an upper left corner, and an upper right corner. When the first interactive emoticon is dragged from top to bottom to the virtual object display region, the lower left corner and the lower right corner first enter the virtual object display region 1402. If the lower left corner and the lower right corner respectively fall into display regions of different to-be-selected virtual objects, a target virtual object cannot be accurately determined. Therefore, a priority may be set for each corner, for example, a priority of the lower left corner is set to a highest level. When the lower left corner and the lower right corner enter the virtual object display region and fall into display regions of different to-be-selected virtual objects, a to-be-selected virtual object corresponding to the lower left corner is used as a target virtual object. In addition, it is considered that when the user drags the first interactive emoticon, there is a case in which the virtual object display region is exceeded and the first interactive emoticon is dragged from bottom to top. In this way, the upper left corner and the upper right corner first enter the virtual image display region 1402 at the same time. When the upper left corner and the upper right corner respectively fall into display regions of different to-be-selected virtual objects, a target virtual object cannot be accurately determined. Therefore, a priority may be set for each corner. For example, a priority of the upper left corner is set to a highest level. In this case, when the upper left corner and the upper right corner enter the virtual object display region and fall into display regions of different to-be-selected virtual objects, a to-be-selected virtual object corresponding to the upper left corner is used as a target virtual object. Priorities of the upper right corner and the lower right corner may be set to be the highest level. This is not specifically limited in this embodiment of this disclosure.

When the first interactive emoticon in the emoticon display region is dragged to the virtual object display region, the target virtual object may also be determined according to a preset corner priority, for example, when the first interactive emoticon is dragged from bottom to top to the virtual object display region, the target virtual object may be determined according to a display region of a to-be-selected virtual object in which the higher-priority upper left corner or upper right corner is located. If dragging exceeds the virtual object display region and dragging from top to bottom is needed, the target virtual object may be determined according to a display region of a to-be-selected virtual object in which the higher-priority lower left corner or lower right corner is located.

Further, an expand control may be further disposed in the virtual object display region, and in response to a trigger operation on the expand control, a virtual object display region may be expanded in some session regions. Virtual images and identifier information of more to-be-selected virtual objects are displayed in the expanded virtual object display region, and the first interactive emoticon is displayed in remaining session regions. For example, the expanded virtual object display region is located in the lower part of the session region and is located above the input box, and the upper part of the session region displays the first interactive emoticon and other chat information. If there is a virtual image and identifier information of the target interaction object in the expanded virtual object display region, the first interactive emoticon is dragged until a display attribute of the target interaction object changes. If there is no virtual image and identifier information of the target interaction object in the expanded virtual object display region, an interface pull-down control in the expanded virtual object display region is triggered, so as to pull down the virtual object display region to a position including the target interaction object, and the first interactive emoticon is dragged until the display attribute of the target interaction object changes.

In an embodiment of this disclosure, the first interactive emoticon may alternatively be dragged from the session region or the emoticon display region to the input box, and after the target interaction object is selected, processing is performed on the first interactive emoticon according to the virtual image and the identifier information of the target interaction object to generate the second interactive emoticon, and in response to a trigger operation on the transmitting control, the second interactive emoticon is transmitted to the session region of the chat interface.

When the target interaction object is selected, a trigger operation on an interaction object identifier control corresponding to the target interaction object may be responded to, so as to display, in the input box, the identifier information corresponding to the target interaction object. The interaction object identifier control may be a functional control disposed in an information input unit, a functional control disposed in the chat interface, or a hidden functional control corresponding to a profile photo of an interaction object displayed in the chat interface. For example, the functional control in the information input unit may be a functional control such as @, &, and * on a keyboard, and the functional control disposed in the chat interface may be a functional control disposed at a position such as an input box region or a position near a virtual object display region. By triggering the functional control, the interaction object selection list may be called out, and the hidden functional control corresponding to the profile photo of the interaction object displayed in the chat interface is a profile photo of the interaction object. The profile photo of the interaction object may be triggered to select the interaction object as a target interaction object. This embodiment of this disclosure includes but is not limited to the foregoing functional controls. Any control that can implement selection of a target interaction object may be used as an interaction object identifier control in this disclosure.

In an embodiment of this disclosure, for different interaction object identifier controls, manners of selecting a target interaction object are also different. When the interaction object identifier control is the functional control disposed in the information input unit or the functional control disposed in the chat interface, an identifier corresponding to the functional control may be displayed in the input box in response to a trigger operation on the functional control, an interaction object selection list may be displayed in the chat interface, selection of the target interaction object may be implemented in response to a trigger operation on the target interaction object in the interaction object selection list or the selection control corresponding to the target interaction object, and the identifier information corresponding to the target interaction object is displayed in the input box. When the interaction object identifier control is the hidden functional control corresponding to the profile photo of the interaction object displayed in the chat interface, selection of the target interaction object is triggered in response to a press operation on the profile photo of the target interaction object, and the identifier information corresponding to the target interaction object is displayed in the input box. The press operation may be specifically a long-press operation, a tap operation, a double tap operation, or the like. This is not specifically limited in this embodiment of this disclosure.

In an embodiment of this disclosure, a drag operation on the first interactive emoticon and a trigger operation on the interaction object identifier control are not in a sequence, provided that after triggering of the first interactive emoticon and selection of the target interaction object are completed, the transmitting control can be triggered to implement transmitting of the second interactive emoticon. In this embodiment of this disclosure, after the first interactive emoticon is dragged to the input box, when text information corresponding to the first interactive emoticon is displayed in the input box to generate the second interactive emoticon, a corresponding interactive emoticon needs to be determined only according to the text information, so that the second interactive emoticon can be generated according to the interactive emoticon and the object information of the target interaction object.

Figure 15A:
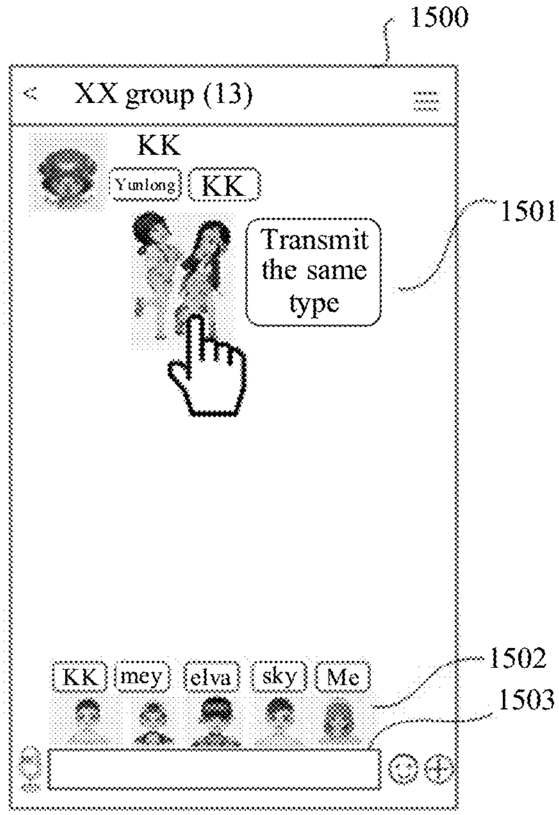
FIG. 15A to FIG. 15G are schematic flowcharts of dragging an interactive emoticon from a session region to an input box to transmit a same type of interactive emoticon according to an embodiment of this disclosure.
Figure 15B:
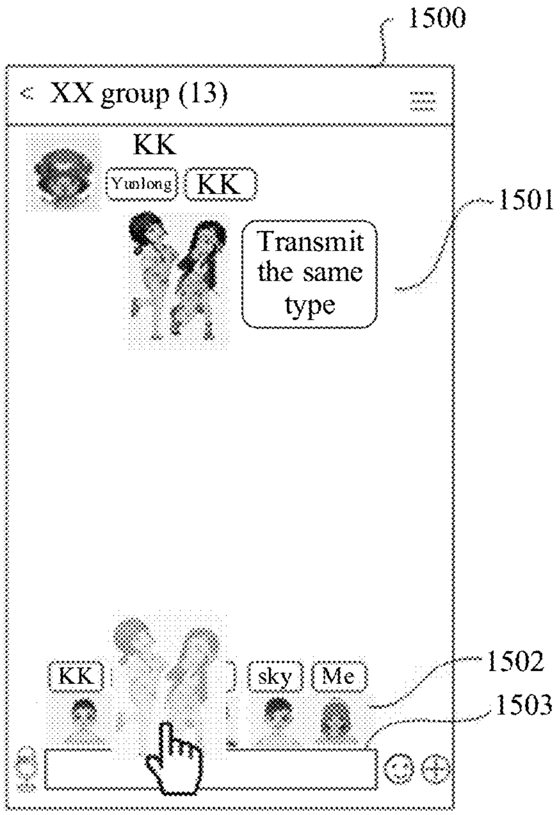
Figure 15C:
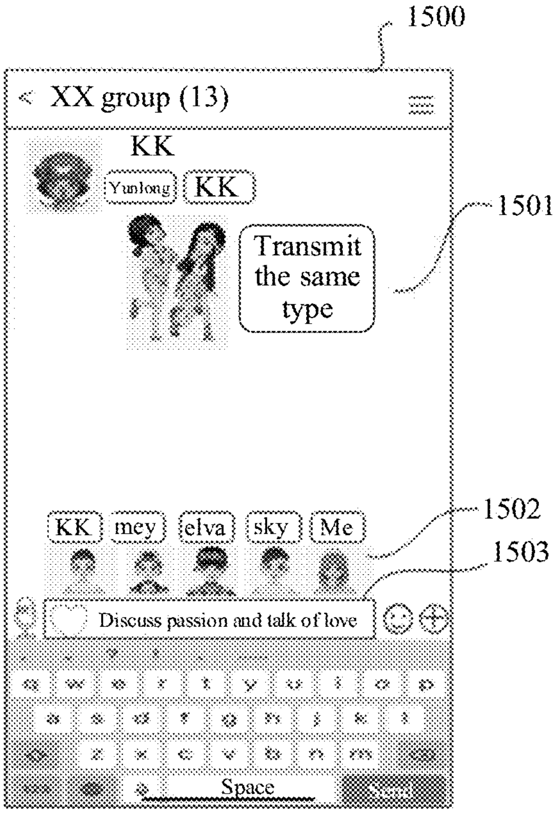
Figure 15D:
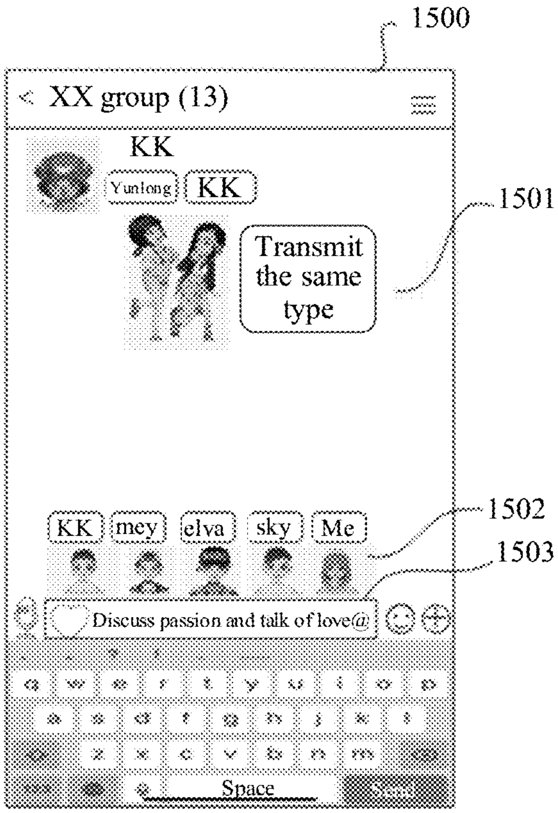
Figure 15E:
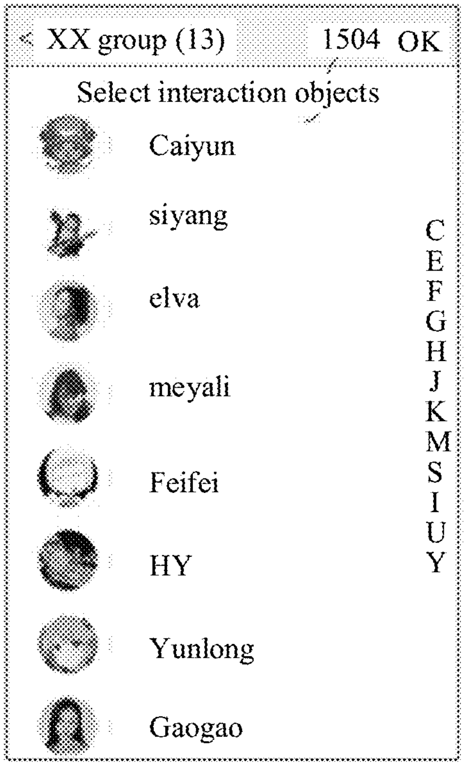
Figure 15F:
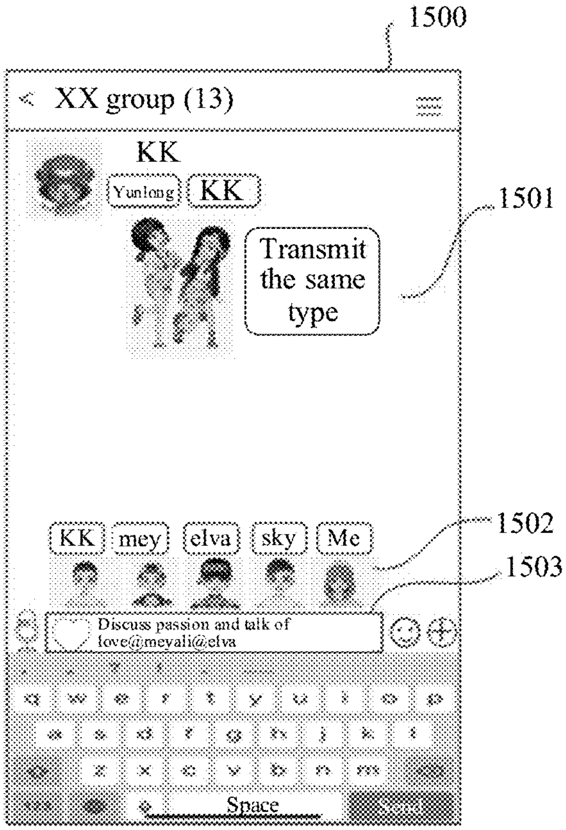
Figure 15G:
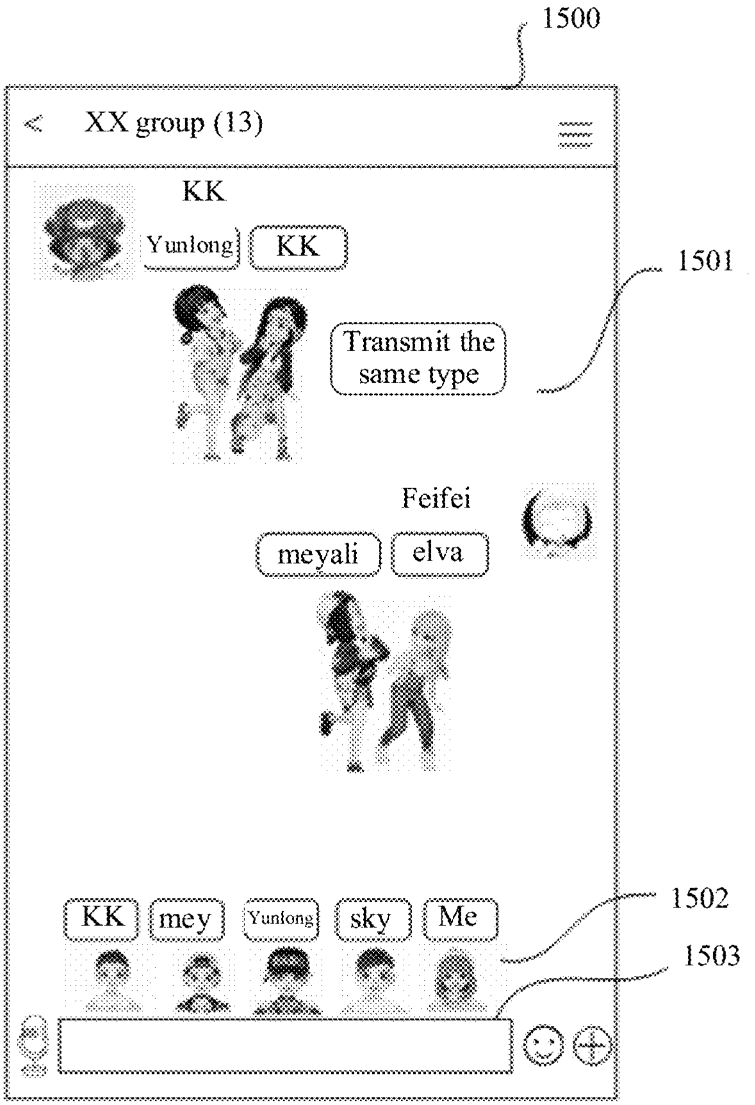

FIG. 15A to FIG. 15G are schematic flowcharts of dragging an interactive emoticon from a session region to an input box to transmit a same type of interactive emoticon. As shown in FIG. 15A, a chat interface 1500 includes a session region 1501, a virtual object display region 1502, and an input box region 1503. A long-press operation on a first interactive emoticon in the session region 1501 is responded to, so that the first interactive emoticon is in a floating state. As shown in FIG. 15B, the first interactive emoticon is dragged to the input box 1503. After the first interactive emoticon is dragged to the input box 1503, the first interactive emoticon is converted into text information corresponding to the first interactive emoticon, as shown in FIG. 15C. In response to a trigger operation on an interaction object identifier control @, an identifier @ corresponding to the interaction object association identifier control @ is displayed in the input box region 1503, as shown in FIG. 15D. Then, an interaction object selection list 1504 is displayed in the chat interface 1500, as shown in FIG. 15E. In response to a trigger operation on a target interaction object in the interaction object selection list 1504 or a selection control (not shown) corresponding to the target interaction object, the target interaction object is selected, the interface switches back to the chat interface 1500 after confirmation, and identifier information of the selected target interaction object is displayed in the input box. As shown in FIG. 15F, identifier information "meyali" and "elva" is displayed in the input box. In response to a trigger operation on a transmitting control, a second interactive emoticon generated according to a virtual image and the identifier information of the target interaction object and the first interactive emoticon is displayed in the chat interface 1500. As shown in FIG. 15G, the left side of the second interactive emoticon is a virtual image of the target interaction object meyali, identifier information meyali is displayed in an identifier display region above the virtual image, the right side is a virtual image of the target interaction object elva, and identifier information elva is displayed in the identifier display region above the virtual image.

When the target interaction object is being selected, a current user may further select a virtual object corresponding to the current user. In this way, the generated second interactive emoticon includes the target interaction object and a virtual image and identifier information of the current user.

Figure 16A:
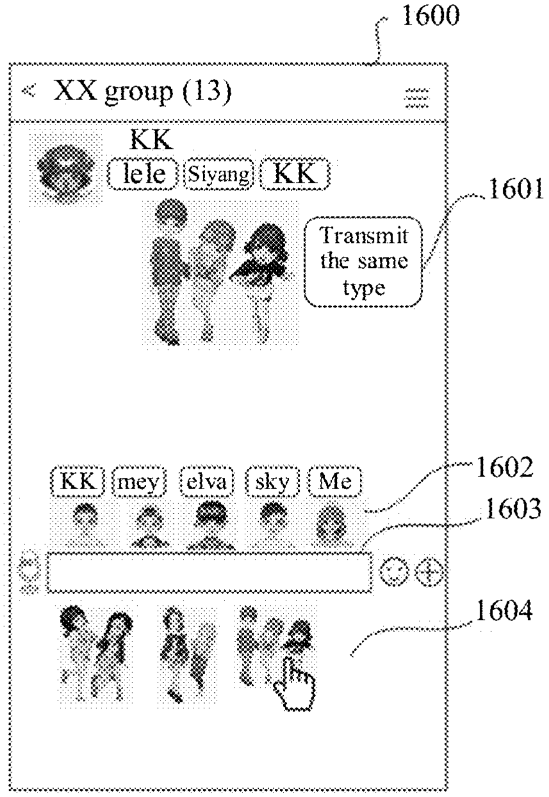
FIG. 16A to FIG. 16G are schematic flowcharts of dragging an interactive emoticon from an emoticon display region to an input box to transmit a same type of interactive emoticon according to an embodiment of this disclosure.
Figure 16B:
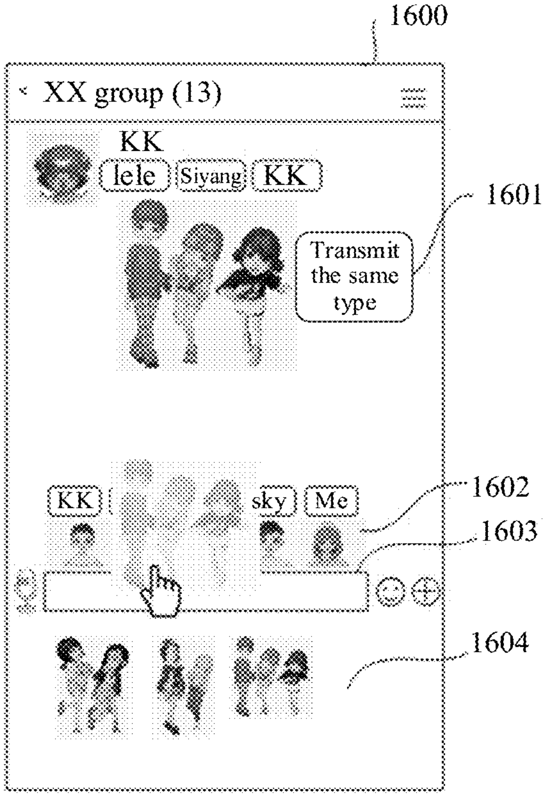
Figure 16C:
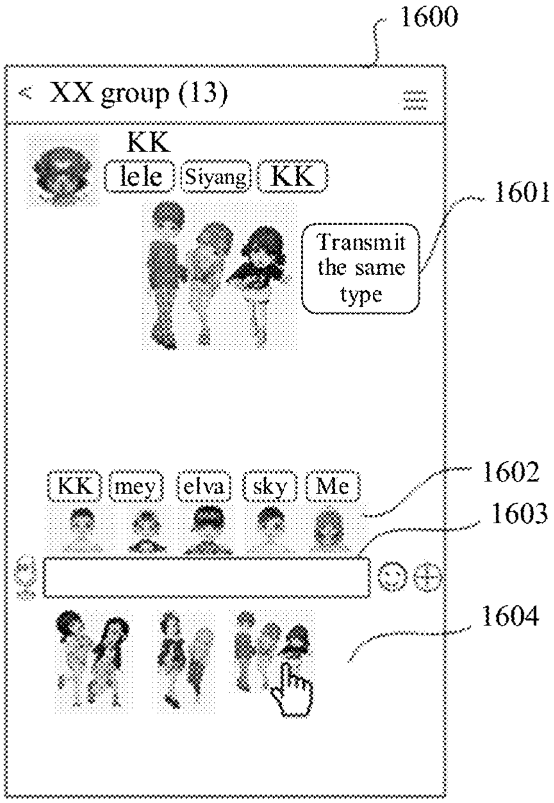
Figure 16D:
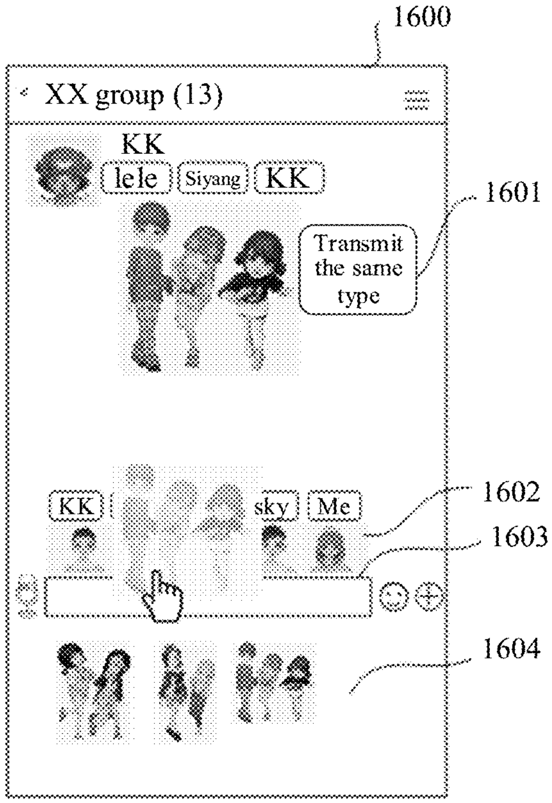
Figure 16E:
Figure 16F:
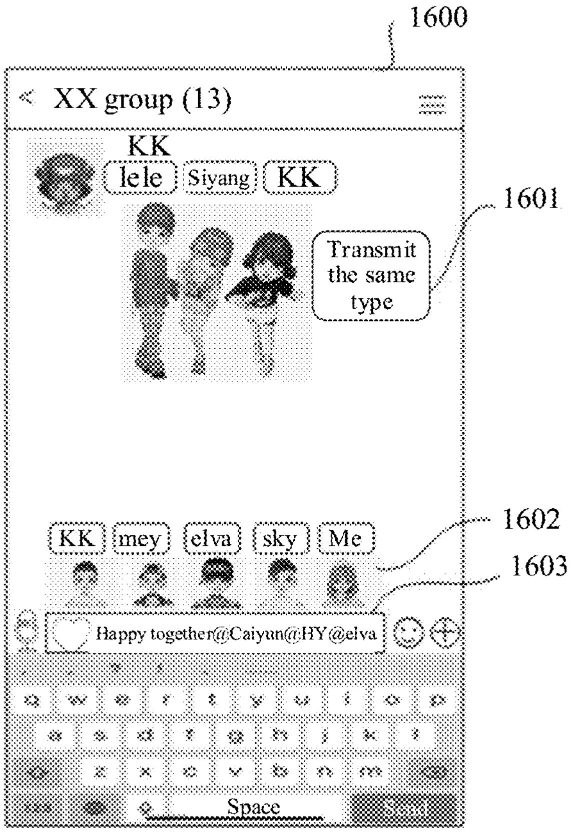
Figure 16G:
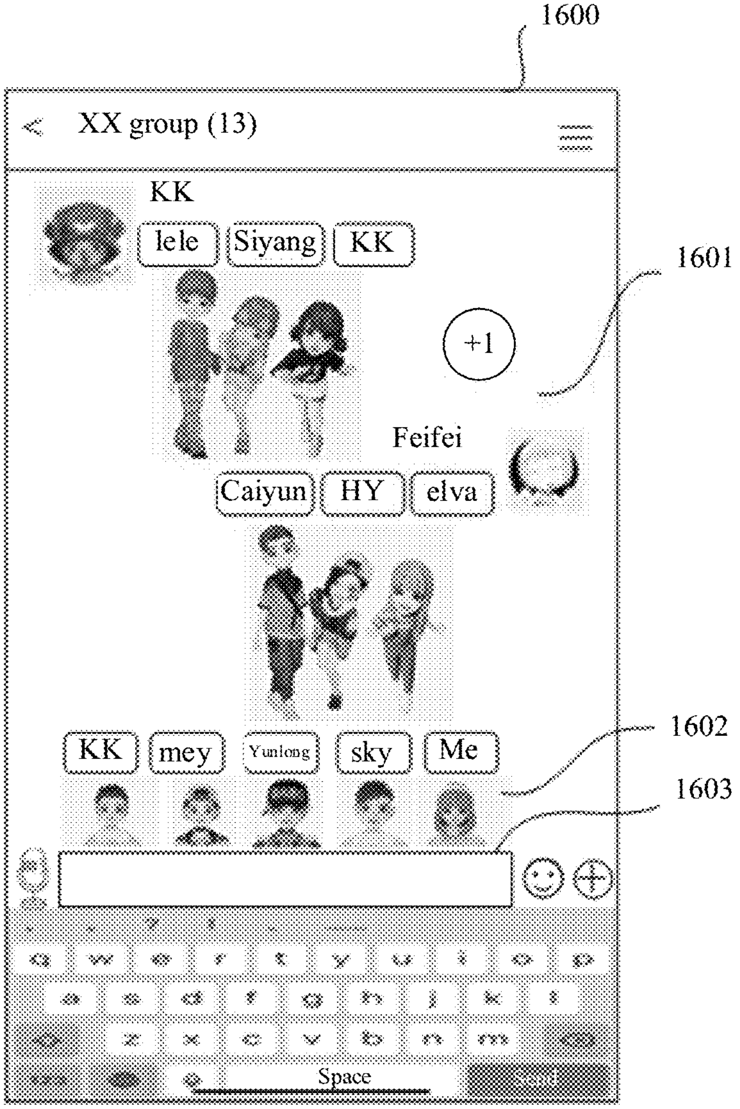

FIG. 16A to FIG. 16G are schematic flowcharts of dragging an interactive emoticon from an emoticon display region to an input box to transmit a same type of interactive emoticon. As shown in FIG. 16A, a chat interface 1600 includes a session region 1601, a virtual object display region 1602, an input box region 1603, and an emoticon display region 1604. A long-press operation on a first interactive emoticon in the emoticon display region 1604 is responded, so that the first interactive emoticon is in a floating state. As shown in FIG. 16B, the first interactive emoticon is dragged to the input box. After the first interactive emoticon is dragged to the input box 1603, the first interactive emoticon is converted into text information corresponding to the first interactive emoticon, as shown in FIG. 16C. In response to a trigger operation on an interaction object identifier control, an association identifier corresponding to the interaction object identifier control is displayed in the input box 1603, for example, @, as shown in FIG. 16D. Then, an interaction object selection list 1604 is displayed in the chat interface 1600, and a target interaction object is selected in response to a trigger operation on the target interaction object in the interaction object selection list 1604 or a selection control corresponding to the target interaction object. As shown in FIG. 16E, three target interaction objects are selected in the interaction object selection list 1604. In response to a trigger operation on an OK control, the interface switches back to the chat interface 1600. Object identifiers "Caiyun", "HY" and "elva" of the three selected target interaction objects are displayed in the input box 1603, as shown in FIG. 16F. In response to a trigger operation on a transmitting control, a second interactive emoticon generated according to a virtual image and identifier information of the target interaction object and the first interactive emoticon is displayed in the chat interface 1600. As shown in FIG. 16G, the left side of the second interactive emoticon is a virtual image and identifier information of the target interaction object "Caiyun", the middle is a virtual image and identifier information of the target interaction object "HY", and the right side is a virtual image and identifier information of the target interaction object "elva".

A method for dragging an interactive emoticon to an input box to transmit a same type of interactive emoticon is applicable to a group chat scenario and a private chat scenario. A method for generating a second interactive emoticon based on a first interactive emoticon is the same as the method for generating a second interactive emoticon in the foregoing embodiment, and a virtual image and identifier information of a virtual object in the first interactive emoticon are replaced by using a virtual image and identifier information of a target interaction object in both methods. When a quantity of target interaction objects is less than a quantity of virtual objects in the first interactive emoticon, virtual images and identifier information of a corresponding quantity of virtual objects in the first interactive emoticon are randomly replaced.

In an embodiment of this disclosure, in a process of dragging an interactive emoticon to an input box, whether to trigger transmitting of a same type of interactive emoticon needs to be determined according to a positional relationship between the interactive emoticon and the input box.

Figure 17:
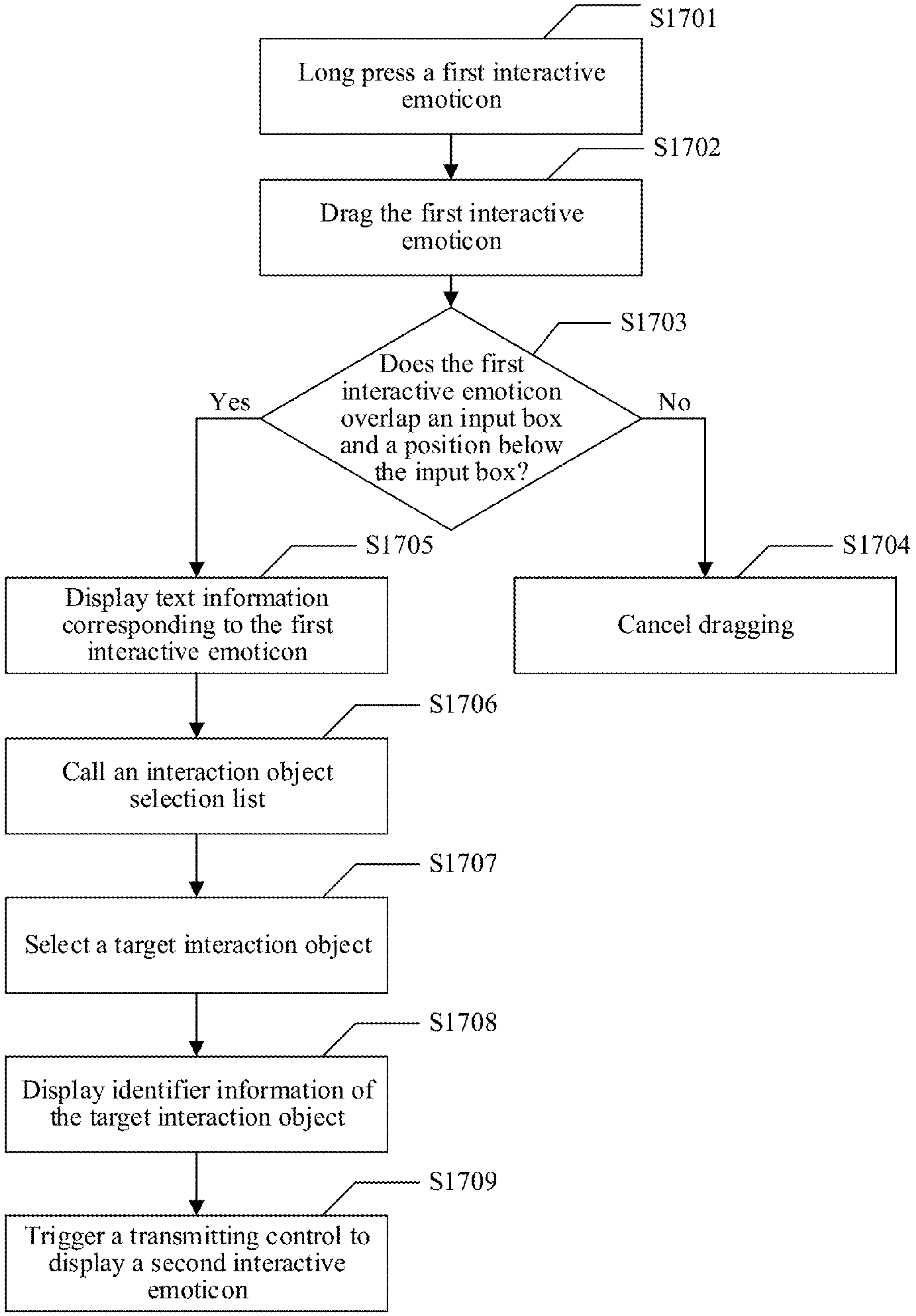
FIG. 17 is a schematic flowchart of dragging an interactive emoticon to an input box to transmit a same type of interactive emoticon according to an embodiment of this disclosure.

FIG. 17 is a schematic flowchart of dragging an interactive emoticon to an input box to transmit a same type of interactive emoticon. As shown in FIG. 17, Step S1701: Long press a first interactive emoticon, so that the first interactive emoticon is in a floating state; Step S1702: Drag the first interactive emoticon; Step S1703: Determine whether the first interactive emoticon overlaps an input box and a position below the input box when dragging ends, and if no, perform step S1704, or if yes, perform step S1705; Step S1704: Cancel dragging of the first interactive emoticon, so that the first interactive emoticon jumps back to an initial display position; Step S1705: Display text information corresponding to the first interactive emoticon in the input box; Step S1706: Call an interaction object selection list in response to a trigger operation on an interaction object identifier control; Step S1707: Select a target interaction object from the interaction object selection list; Step S1708: Display identifier information of the selected target interaction object in the input box; and Step S1709: Transmit and display, in the chat interface in response to a trigger operation on a transmitting control, a second interactive emoticon generated according to a virtual image and identifier information of the target interaction object and the first interactive emoticon.

When the second interactive emoticon is generated according to the virtual image and the identifier information of the target interaction object and the first interactive emoticon, a virtual image and identifier information of a virtual object in the first interactive emoticon are replaced with the virtual image and the identifier information of the target interaction object, so as to form the second interactive emoticon.

In an embodiment of this disclosure, steps S1706-S1708 may be performed before step S1701, that is, the target interaction object is first selected, the first interactive emoticon is then dragged to the input box, and finally, the second interactive emoticon is displayed in the chat interface by tapping "transmit".

Figure 18:
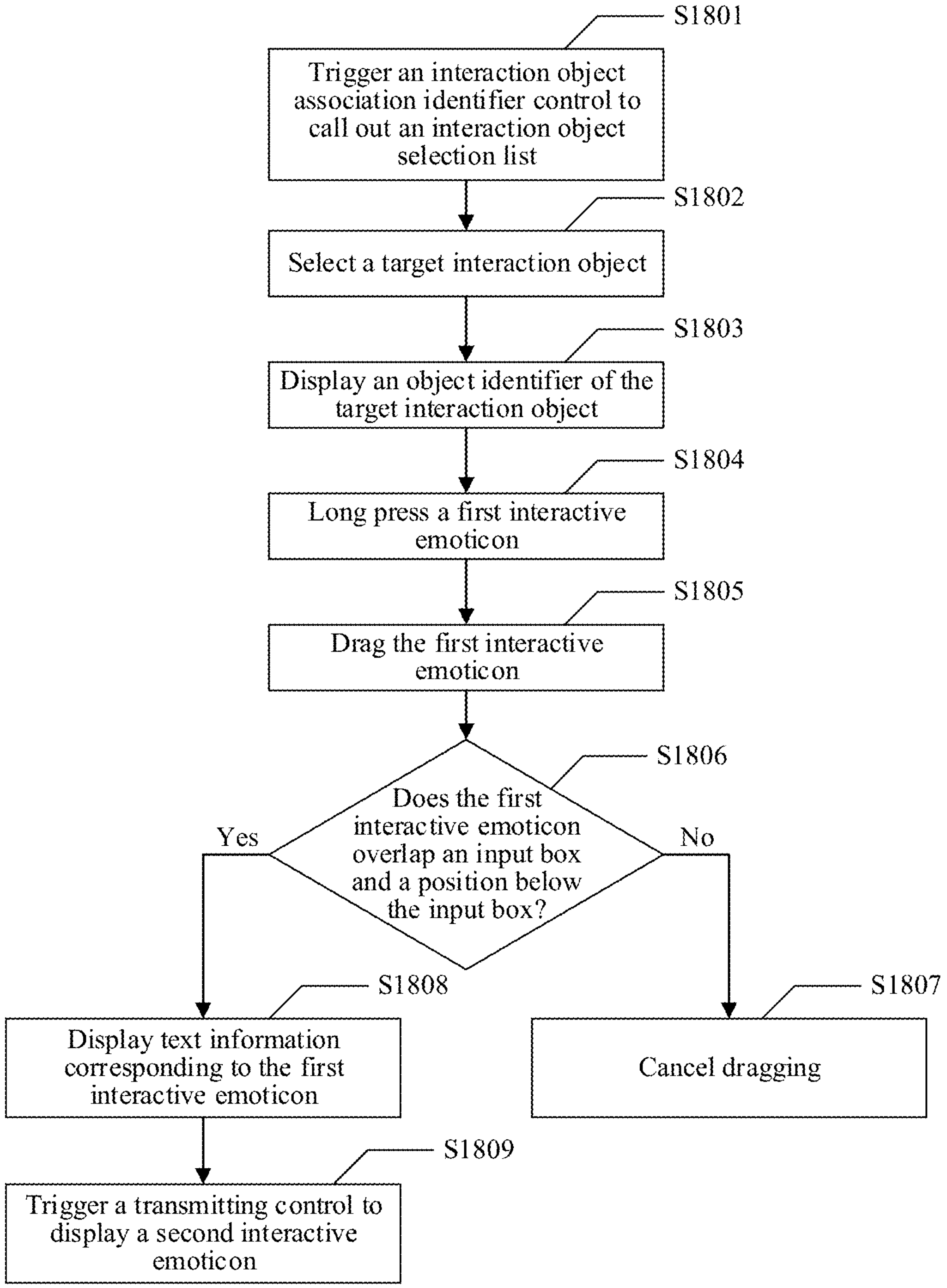
FIG. 18 is a schematic flowchart of dragging an interactive emoticon to an input box to transmit a same type of interactive emoticon according to an embodiment of this disclosure.

FIG. 18 is a schematic flowchart of dragging an interactive emoticon to an input box to transmit a same type of interactive emoticon. As shown in FIG. 18, Step S1801: Call out an interaction object selection list in response to a trigger operation on an interaction object identifier control; Step S1802: Select a target interaction object from the interaction object selection list; Step S1803: Display an object identifier of the selected target interaction object in an input box; Step S1804: Long press a first interactive emoticon, so that the first interactive emoticon is in a floating state; Step S1805: Drag the first interactive emoticon; Step S1806: Determine whether the first interactive emoticon overlaps an input box and a position below the input box when dragging ends, and if no, perform step S1807, or if yes, perform step S1808; Step S1807: Cancel dragging of the first interactive emoticon, so that the first interactive emoticon jumps back to an initial display position; Step S1808: Display text information corresponding to the first interactive emoticon in the input box; and Step S1809: Transmit and display, in the chat interface in response to a trigger operation on a transmitting control, a second interactive emoticon generated according to a virtual image and identifier information of the target interaction object and the first interactive emoticon.

According to the interactive emoticon transmitting method provided in this disclosure, selection of a target interaction object is triggered in response to a trigger operation on a first interactive emoticon displayed in a chat interface. After the target interaction object is selected, a second interactive emoticon may be generated according to the first interactive emoticon and object information of the target interaction object, where the first interactive emoticon includes an interaction effect between at least two virtual objects, and the generated second interactive emoticon has the same interaction effect as the first interactive emoticon. In the interactive emoticon transmitting method in this disclosure, different trigger operations can be performed on the first interactive emoticon, and different target interaction objects can be selected in different forms, so that virtual images and identifier information in the interactive emoticon are replaced based on different target interaction objects on the basis of remaining the interaction effect of the interactive emoticon, so that the interactive emoticon has different display effects, versatility of the interactive emoticon and interest of transmitting the interactive emoticon are improved, and efficiency of transmitting the interactive emoticon can be improved, thereby improving user experience.

It may be understood that, in specific implementations of this disclosure, related data such as registration information and configuration information of a current user and a chat object in social instant messaging software is involved. When the foregoing embodiments of this disclosure are applied to a specific product or technology, permission or consent of a user of a terminal needs to be obtained, and collection, use, and processing of the related data need to comply with relevant laws and standards of a relevant country and region.

Although the various steps of the method in this disclosure are described in a specific order in the accompanying drawings, this does not require or imply that the steps are bound to be performed in the specific order, or all the steps shown are bound to be performed to achieve the expected result. Additionally or alternatively, some steps may be omitted, a plurality of steps may be combined into one step for execution, and/or one step may be decomposed into a plurality of steps for execution, and the like.

Figure 19:
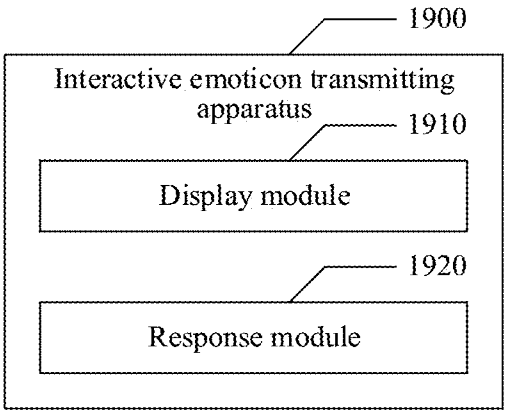
FIG. 19 is a schematic structural block diagram of an interactive emoticon transmitting apparatus according to an embodiment of this disclosure.

The following describes the apparatus embodiments of this disclosure, which may be configured to perform the method in the foregoing embodiments of this disclosure. FIG. 19 is a schematic structural block diagram of an interactive emoticon transmitting apparatus according to an embodiment of this disclosure. As shown in FIG. 19, the interactive emoticon transmitting apparatus 1900 includes a display module 1910 and a response module 1920. Specifically, the display module 1910 is configured to display a first interactive emoticon in a chat interface, the first interactive emoticon including an interaction effect between at least two virtual objects; the response module 1920 is configured to: trigger selection of a target interaction object in response to a trigger operation on the first interactive emoticon; and the display module 1910 is further configured to display a second interactive emoticon generated according to object information corresponding to the target interaction object, the second interactive emoticon and the first interactive emoticon having a same interaction effect.

In some embodiments of this disclosure, based on the foregoing technical solutions, the display module 1910 is configured to display the first interactive emoticon in a session region of the chat interface; or display the first interactive emoticon in an emoticon display region of the chat interface in response to a trigger operation on an emoticon list control.

In some embodiments of this disclosure, based on the foregoing technical solutions, in a case that the first interactive emoticon is displayed in the session region of the chat interface, the trigger operation includes: a trigger operation on a same-emoticon transmitting control of the first interactive emoticon, a press operation on the first interactive emoticon, or a drag operation on the first interactive emoticon; and in a case that the first interactive emoticon is displayed in the emoticon display region of the chat interface, the trigger operation includes: a press operation on the first interactive emoticon or a drag operation on the first interactive emoticon.

In some embodiments of this disclosure, in a case that the trigger operation is a trigger operation on the same-emoticon transmitting control corresponding to the first interactive emoticon, based on the foregoing technical solution, the response module 1920 is configured to: display an interaction object selection list in the chat interface in response to the trigger operation on the same-emoticon transmitting control; and trigger selection of the target interaction object in response to a trigger operation on the target interaction object in the interaction object selection list or a selection control corresponding to the target interaction object.

In some embodiments of this disclosure, in a case that the trigger operation is a press operation on the first interactive emoticon, based on the foregoing technical solutions, the response module is configured to: display an interaction object selection list in the chat interface in response to the press operation on the first interactive emoticon; and trigger selection of the target interaction object in response to a trigger operation on the target interaction object in the interaction object selection list or a selection control corresponding to the target interaction object.

In some embodiments of this disclosure, based on the foregoing technical solutions, the press operation includes a long-press operation or a tap operation.

In some embodiments of this disclosure, based on the foregoing technical solutions, the drag operation on the first interactive emoticon includes: dragging the first interactive emoticon to a virtual object display region in the chat interface; or dragging the first interactive emoticon to an input box.

In some embodiments of this disclosure, in a case that the drag operation on the first interactive emoticon is to drag the first interactive emoticon to the virtual object display region, based on the foregoing technical solutions, the response module 1920 is configured to: obtain a to-be-selected virtual object that overlaps the first interactive emoticon and that is in the virtual object display region, as the target interaction object.

In some embodiments of this disclosure, based on the foregoing technical solutions, the response module 1920 is further configured to: change a display attribute of a virtual image and/or identifier information corresponding to the to-be-selected virtual object in a case that the first interactive emoticon overlaps the to-be-selected virtual object.

In some embodiments of this disclosure, in a case that the drag operation on the first interactive emoticon is to drag the first interactive emoticon to the input box, based on the foregoing technical solutions, the response module 1920 is configured to: display, in the input box, identifier information corresponding to the target interaction object in response to a trigger operation on a first interaction object identifier control, the first interaction object identifier control being an interaction object identifier control corresponding to the target interaction object.

In some embodiments of this disclosure, based on the foregoing technical solutions, the interaction object identifier control is a functional control disposed in an information input unit, a functional control disposed in the chat interface, or a hidden functional control corresponding to a profile photo of an interaction object displayed in the chat interface.

In some embodiments of this disclosure, in a case that the interaction object identifier control is a functional control disposed in the information input unit or a functional control disposed in the chat interface, based on the foregoing technical solutions, the response module 1920 is configured to: display, in response to a trigger operation on the functional control, an identifier corresponding to the functional control in the input box, and display an interaction object selection list in the chat interface; and display, in the input box, the identifier information corresponding to the target interaction object in response to a trigger operation on the target interaction object in the interaction object selection list or a selection control corresponding to the target interaction object.

In some embodiments of this disclosure, based on the foregoing technical solutions, the interactive emoticon transmitting apparatus 1900 is further configured to: display text information corresponding to the first interactive emoticon in the input box after the first interactive emoticon is dragged to the input box.

In some embodiments of this disclosure, based on the foregoing technical solutions, a quantity of target interaction objects is less than or equal to a quantity of virtual objects in the first interactive emoticon.

In some embodiments of this disclosure, the object information includes a virtual image and the identifier information corresponding to the target interaction object. Based on the foregoing technical solutions, the display module 1910 is further configured to: replace virtual images and identifier information of all or some virtual objects in the first interactive emoticon with the virtual image and the identifier information of the target interaction object, so as to generate and display the second interactive emoticon.

In some embodiments of this disclosure, based on the foregoing technical solutions, the second interactive emoticon includes a virtual image and identifier information corresponding to a current user.

Specific details of the interactive emoticon transmitting apparatus provided in the embodiment of this disclosure have been described in detail in corresponding method embodiments. Details are not described herein again.

Figure 20:
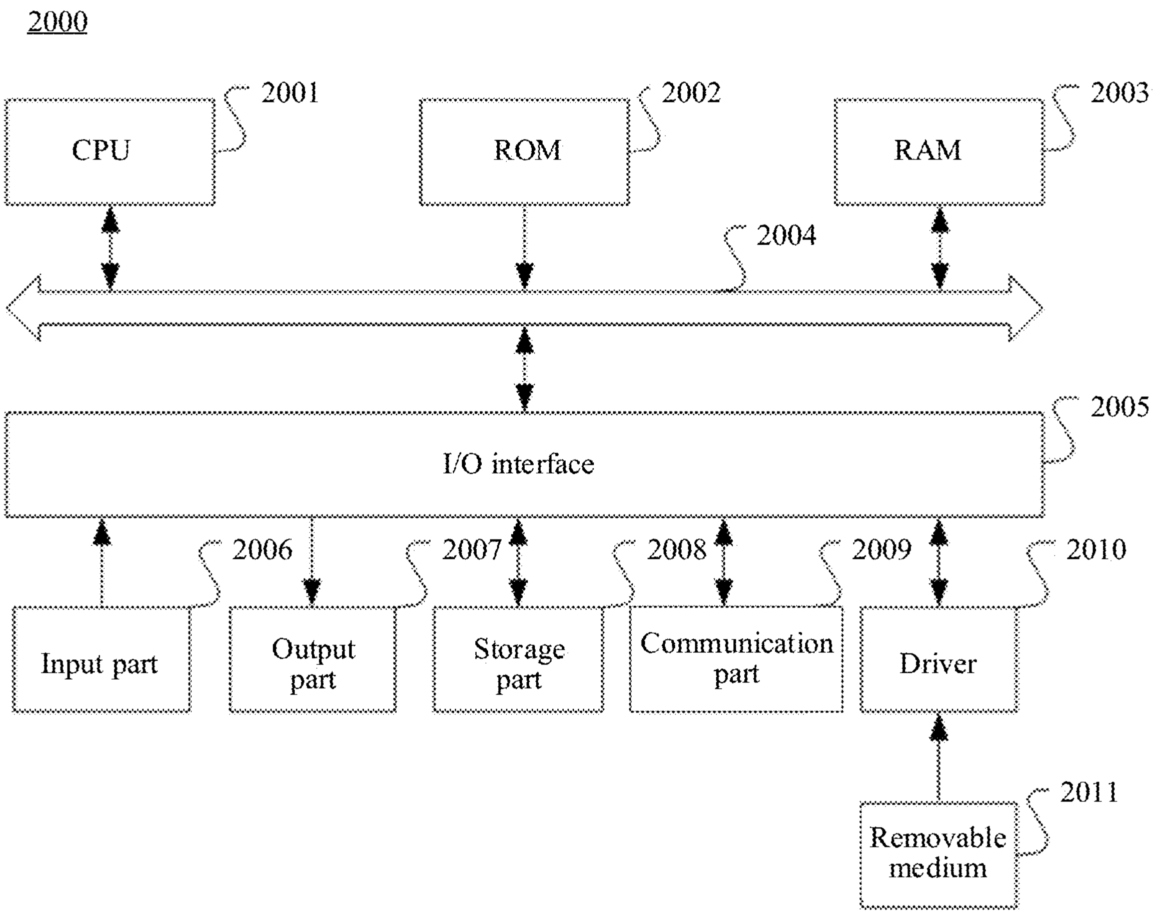
FIG. 20 is a schematic structural block diagram of a computer system applicable to an electronic device used for implementing an embodiment of this disclosure.

FIG. 20 is a schematic structural block diagram of a computer system of an electronic device used for implementing an embodiment of this disclosure. The electronic device may be the first terminal 101, the second terminal 102, and the server 103 shown in FIG. 1.

A computer system 2000 of the electronic device shown in FIG. 20 is merely an example, and does not constitute any limitation on functions and use ranges of the embodiments of this disclosure.

As shown in FIG. 20, the computer system 2000 includes processing circuitry, such as a central processing unit (CPU) 2001, which may perform various suitable actions and processing based on a program stored in a read-only memory (ROM) 2002 or a program loaded from a storage part 2008 into a random access memory (RAM) 2003. The random access memory 2003 further stores various programs and data required for operating the system. The central processing unit 2001, the read-only memory 2002, and the random access memory 2003 are connected to each other by using a bus 2004. An input/output interface (I/O interface) 2005 is also connected to the bus 2004.

In some embodiments, the following parts are connected to the input/output interface 2005: an input part 2006 including a keyboard, a mouse, and the like; an output part 2007 including, for example, a cathode ray tube (CRT), a liquid crystal display (LCD), a speaker, and the like; a storage part 2008 including a hard disk or the like; and a communication part 2009 including a network interface card such as a local area network card and a modem. The communication part 2009 performs communication processing by using a network such as the Internet. A driver 2010 is also connected to the input/output interface 2005 as required. A removable medium 2011, such as a magnetic disk, an optical disc, a magneto-optical disk, or a semiconductor memory, is installed on the driver 2010 as required, so that a computer program read from the removable medium is installed into the storage part 2008 as required.

In particular, according to the embodiments of this disclosure, processes described in each method flowchart may be implemented as computer software programs. For example, this embodiment of this disclosure includes a computer program product, the computer program product includes a computer program carried on a computer-readable medium, and the computer program includes program code used for performing the methods shown in the flowcharts. In such an embodiment, by using the communication part 2009, the computer program may be downloaded and installed from a network, and/or installed from the removable medium 2011. When the computer program is executed by the central processing unit 2001, the various functions defined in the system of this disclosure are executed.

The computer readable medium shown in the embodiments of this disclosure may be a computer readable signal medium or a computer readable medium, such as a non-transitory computer-readable storage medium, or any combination of the two. The computer readable medium may be, for example, but is not limited to, an electric, magnetic, optical, electromagnetic, infrared, or semi-conductive system, apparatus, or component, or any combination of the above. A more specific example of the computer readable medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this disclosure, the computer readable medium may be any tangible medium containing or storing a program, and the program may be used by or used in combination with an instruction execution system, an apparatus, or a device. In this disclosure, a computer readable signal medium may include a data signal being in a baseband or propagated as a part of a carrier wave, the data signal carrying computer readable program code. A data signal propagated in such a way may assume a plurality of forms, including, but not limited to, an electromagnetic signal, an optical signal, or any appropriate combination thereof. The computer readable signal medium may be further any computer readable medium in addition to a computer readable medium. The computer readable medium may transmit, propagate, or transmit a program that is used by or used in conjunction with an instruction execution system, an apparatus, or a device. The program code included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of this disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in the accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

Although a plurality of modules or units of a device configured to perform actions are discussed in the foregoing detailed description, such division is not mandatory. Actually, according to the implementations of this disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the embodiments of this disclosure may be implemented in a form of a software product. The software product may be stored in a non-volatile storage medium (which may be a CD-ROM, a USB flash drive, a removable hard disk, or the like) or on the network, including several instructions for instructing an electronic device to perform the methods according to the embodiments of this disclosure.

What is claimed is:

1. An image transmission method, comprising:

displaying a first image in a messaging interface, the first image including an interaction effect between a plurality of virtual objects, the interaction effect indicating an interaction between the plurality of virtual objects or a joint activity of the plurality of virtual objects;

receiving a request from a current user to transmit a second image that is based on the first image;

determining a target user to which the second image is to be transmitted; and displaying, in the messaging interface, the second image that is generated according to object information of the determined target user and the first image in the messaging interface, the second image and the first image including the same interaction effect, the interaction effect of the second image being between a second plurality of virtual objects, wherein the second image is different from the first image.

2. The method according to claim 1, wherein the object information of the target user includes a virtual image corresponding to the target user, and the second image includes the virtual image of the target user, the virtual image of the target user being different from a respective virtual image of each virtual object of the plurality of virtual objects included in the first image.

3. The method according to claim 1, further comprising:

displaying a target user selection list in the messaging interface in response to the request to transmit the second image, wherein the determining the target user includes determining the target user based on a selection of the target user from the target user selection list by the current user.

4. The method according to claim 1, wherein the receiving the request comprises:

receiving a selection of a second image control element of the messaging interface by the current user.

5. The method according to claim 1, wherein the receiving the request comprises:

receiving user selection of the displayed first image by the current user.

6. The method according to claim 1, wherein the receiving the request comprises:

receiving a drag operation performed by the current user that drags the first image to a predefined region of the messaging interface.

7. The method according to claim 6, wherein the predefined region of the messaging interface is a target user selection region, and the determining the target user includes determining a to-be-selected user in the target user selection region as the target user based on a position of the dragged first image within the target user selection region.

8. The method according to claim 7, further comprising:

changing a display attribute of a virtual image corresponding to the to-be-selected user when the first image overlaps a position of the to-be-selected user within the target user selection region.

9. The method according to claim 6, wherein the predefined region of the messaging interface is a message input region, and the method further includes displaying, in the message input region, identifier information corresponding to the target user based on selection of a user identifier control element corresponding to the target user by the current user.

10. The method according to claim 9, further comprising:

displaying text information corresponding to the first image in the message input region after the first image is dragged to the message input region.

11. The method according to claim 1, wherein a quantity of target users for the second image is less than or equal to a quantity of the plurality of virtual objects in the first image.

12. The method according to claim 1, wherein the object information includes a virtual image corresponding to the target user and identifier information corresponding to the target user; and a virtual image and identifier information of another user included in the first image are replaced with the virtual image and the identifier information of the target user.

13. The method according to claim 1, wherein the second image includes a virtual image and identifier information corresponding to the current user.

14. The method according to claim 1, wherein a number of virtual objects in the second plurality of virtual objects in the second image is equal to a number of virtual objects in the plurality of virtual objects in the first image.

15. The method according to claim 1, wherein a first virtual object of the second plurality of virtual objects in the second image is different from each virtual object of the plurality of virtual objects in the first image.

16. The method according to claim 15, wherein when the second plurality of virtual objects in the second image is the same as the plurality of virtual objects in the first image, a position of the first virtual object in the second image is different from a position of the first virtual object in the first image.

17. An information processing apparatus, comprising:

processing circuitry configured to:

display a first image in a messaging interface, the first image including an interaction effect between a plurality of virtual objects, the interaction effect indicating an interaction between the plurality of virtual objects or a joint activity of the plurality of virtual objects;

receive a request from a current user to transmit a second image that is based on the first image;

determine a target user to which the second image is to be transmitted; and display, in the messaging interface, the second image that is generated according to object information of the determined target user and the first image in the messaging interface, the second image and the first image including the same interaction effect, the interaction effect of the second image being between a second plurality of virtual objects, wherein the second image is different from the first image.

18. The information processing apparatus according to claim 17, wherein the object information of the target user includes a virtual image corresponding to the target user, and the second image includes the virtual image of the target user, the virtual image of the target user being different from a respective virtual image of each virtual object of the plurality of virtual objects included in the first image.

19. The information processing apparatus according to claim 17, wherein the object information includes a virtual image corresponding to the target user and identifier information corresponding to the target user; and a virtual image and identifier information of another user included in the first image are replaced with the virtual image and the identifier information of the target user.

20. A non-transitory computer-readable storage medium storing instructions which when executed by a processor cause the processor to perform:

displaying a first image in a messaging interface, the first image including an interaction effect between a plurality of virtual objects, the interaction effect indicating an interaction between the plurality of virtual objects or a joint activity of the plurality of virtual objects;

receiving a request from a current user to transmit a second image that is based on the first image;

determining a target user to which the second image is to be transmitted; and displaying, in the messaging interface, the second image that is generated according to object information of the determined target user and the first image in the messaging interface, the second image and the first image including the same interaction effect, the interaction effect of the second image being between a second plurality of virtual objects, wherein the second image is different from the first image.

* * * * *